US010122290B2

(12) United States Patent
Murray

(10) Patent No.: US 10,122,290 B2
(45) Date of Patent: Nov. 6, 2018

(54) SWITCHED ENERGY RESONANT POWER SUPPLY SYSTEM

(71) Applicant: James F. Murray, Oklahoma City, OK (US)

(72) Inventor: James F. Murray, Oklahoma City, OK (US)

(*) Notice: Subject to any disclaimer, the term of this patent is extended or adjusted under 35 U.S.C. 154(b) by 4 days.

(21) Appl. No.: 15/377,860

(22) Filed: Dec. 13, 2016

(65) Prior Publication Data

US 2017/0169941 A1  Jun. 15, 2017

Related U.S. Application Data

(60) Provisional application No. 62/267,170, filed on Dec. 14, 2015, provisional application No. 62/415,226, filed on Oct. 31, 2016.

(51) Int. Cl.
*H02M 5/297* (2006.01)
*H02M 1/00* (2006.01)
(Continued)

(52) U.S. Cl.
CPC ............ *H02M 5/297* (2013.01); *H02J 3/383* (2013.01); *H02M 1/4233* (2013.01);
(Continued)

(58) Field of Classification Search
CPC ...... H02M 7/155; H02M 7/162; H02M 7/217; H02M 7/219; H02M 2007/2195;
(Continued)

(56) References Cited

U.S. PATENT DOCUMENTS 1,363,167 A   12/1920   Peugeot Robert
3,313,993 A    4/1967   Rupp
(Continued)

FOREIGN PATENT DOCUMENTS

GB        2282708 A     4/1995

OTHER PUBLICATIONS

YouTube Webpage, "Man Solves Tesla's Secret to Amplifying Power by Nearly 5000%," Published Oct. 30, 2015, Retrieved from: https://www.youtube.com/watch?v=HK3JOIY0V8Y.

*Primary Examiner* — Fred E Finch, III
*Assistant Examiner* — Rafael O De Leon Domenech
(74) *Attorney, Agent, or Firm* — Craige Thompson; Thompson Patent Law

(57) ABSTRACT

Apparatus and associated methods relate to a switching network that (1) receives energy from an input source that magnetically excites an output winding, (2) stores some of that energy in a series capacitance while delivering power to a resistive load during a first excitation cycle portion, and (3) then injects some of the stored energy back to the input source by injecting current into a tap of the output winding while delivering power to the resistive load and during a second excitation cycle portion. In an illustrative example, the first excitation cycle portion may include a first positive or negative quarter cycle of the excitation waveform. The second excitation cycle portion may include a second positive or negative quarter cycle of the excitation waveform. The energy injected back to the input source during the second excitation cycle portion may advantageously provide, for example, an assisting torque to a prime mover.

20 Claims, 19 Drawing Sheets

(51) Int. Cl.
*H02M 1/42* (2007.01)
*H02M 5/293* (2006.01)
*H02M 7/219* (2006.01)
*H02M 7/155* (2006.01)
*H02M 7/162* (2006.01)
*H02M 7/217* (2006.01)
*H02J 3/38* (2006.01)
*H02P 9/14* (2006.01)

(52) U.S. Cl.
CPC ............ *H02M 5/293* (2013.01); *H02M 7/155* (2013.01); *H02M 7/162* (2013.01); *H02M 7/217* (2013.01); *H02M 7/219* (2013.01); *H02M 2001/0048* (2013.01); *H02M 2007/2195* (2013.01); *H02P 9/14* (2013.01); *Y02E 10/563* (2013.01)

(58) Field of Classification Search
CPC ....... H02M 2001/0048; H02M 1/4233; H02M 5/293; H02M 5/297
See application file for complete search history.

(56) References Cited

U.S. PATENT DOCUMENTS

| | | | |
|---|---|---|---|
| 3,523,192 A | 8/1970 | Lang | |
| 4,064,442 A | 12/1977 | Garron | |
| 4,780,632 A | 10/1988 | Murray, III | |
| 5,227,702 A | 7/1993 | Nahirney | |
| 5,396,165 A | 3/1995 | Hwang et al. | |
| 5,705,918 A | 1/1998 | Davis | |
| 5,852,558 A * | 12/1998 | Julian | H02M 1/12 363/132 |
| 5,892,664 A * | 4/1999 | Vedder | H02M 7/4807 323/906 |
| 6,064,122 A | 5/2000 | McConnell | |
| 6,392,370 B1 | 5/2002 | Bedini | |
| 6,545,444 B2 | 4/2003 | Bedini | |
| 6,657,535 B1 | 12/2003 | Patarchi | |
| 6,710,495 B2 | 3/2004 | Lipo et al. | |
| 7,411,363 B2 | 8/2008 | Lam | |
| 7,602,157 B2 | 10/2009 | Babcock et al. | |
| 8,860,273 B2 | 10/2014 | Babcock et al. | |
| 2007/0296373 A1 | 12/2007 | Lam | |
| 2008/0013351 A1* | 1/2008 | Alexander | H02M 3/1582 363/123 |
| 2009/0201620 A1 | 8/2009 | Gray et al. | |
| 2012/0014151 A1* | 1/2012 | Alexander | H02M 5/225 363/123 |
| 2012/0250359 A1* | 10/2012 | Knill | H02J 3/32 363/17 |
| 2012/0250372 A1* | 10/2012 | Knill | H02M 3/3374 363/37 |
| 2012/0250374 A1* | 10/2012 | Knill | H02M 3/3374 363/37 |
| 2013/0279207 A1* | 10/2013 | Yu | H02M 3/33507 363/21.06 |
| 2015/0003115 A1* | 1/2015 | Barron | H02M 1/08 363/17 |
| 2015/0061569 A1* | 3/2015 | Alexander | B60L 11/1809 320/101 |
| 2015/0295504 A1* | 10/2015 | Tanahashi | H02M 3/33584 307/24 |

\* cited by examiner

SWITCHED ENERGY RESONANT POWER SUPPLY SYSTEM

CROSS-REFERENCE TO RELATED APPLICATIONS

This application claims the benefit of U.S. Provisional Application Ser. No. 62/415,226, titled "Switched Energy Resonant Power Supply," filed by James F. Murray III, on Oct. 31, 2016, and U.S. Provisional Application Ser. No. 62/267,170, titled "Switched Energy Resonant Power Supply," filed by Paul Babcock, et al., on Dec. 14, 2015.

This application incorporates the entire contents of the foregoing application(s) herein by reference.

TECHNICAL FIELD

Various embodiments relate generally to alternating-current power distribution through a magnetically coupled winding.

BACKGROUND

Power converters are used in electrical products and appliances. Power converters are used to step-up, step-down, and/or condition an electrical line. Some power converters convert Alternating Current ("AC") power to Direct Current ("DC") power. Some power converters convert DC power to AC power. Some power converters convert power from one source into a multiplicity of different loads. Sometimes each of these different loads require power in compliance with a different specification. For example, a computer's power converter may convert 115 VAC line power to +12 VDC, +5 VDC, +3.3 VDC, +2.5 VDC and −12 VDC.

SUMMARY

Apparatus and associated methods relate to a switching network that (1) receives energy from an input source that magnetically excites an output winding, (2) stores some of that energy in a series capacitance while delivering power to a resistive load during a first excitation cycle portion, and (3) then injects some of the stored energy back to the input source by injecting current into a tap of the output winding while delivering power to the resistive load and during a second excitation cycle portion. In an illustrative example, the first excitation cycle portion may include a first positive or negative quarter cycle of the excitation waveform. The second excitation cycle portion may include a second positive or negative quarter cycle of the excitation waveform. The energy injected back to the input source during the second excitation cycle portion may advantageously provide, for example, an assisting torque to a prime mover.

The excitation waveform may be substantially symmetric and periodic such as, for example, a substantially sinusoidal waveform. In various examples, the input source may include an armature winding magnetically coupled in a rotating relationship to the output winding. In some implementations, the input source may include a stationary transformer winding that is magnetically coupled to the output winding, for example.

In one exemplary aspect, a method includes providing a magnetic flux path to couple energy between an input source and an output winding. The method further includes providing a charging terminal and a return terminal at opposite ends of the output winding, and an injection terminal at a tap between the charging terminal and the return terminal. The method also includes exciting the magnetic flux path with a periodic flux waveform alternately having a positive half-cycle and a negative half-cycle. The positive half-cycle is formed of temporally adjacent first and second quarter cycles, and the negative half-cycle is formed of temporally adjacent third and fourth quarter cycles. During the first quarter cycle, the method provides a positive charging current path from the charging terminal to the return terminal through a series capacitance and a resistive load to transfer energy from the flux waveform to the resistive load. The method further includes interrupting the charging current path at a predetermined point in the positive half-cycle. Then, during the second quarter cycle, it provides a positive injection current path from the return terminal to the injection terminal through the series capacitance and the resistive load to transfer energy to the input source while simultaneously dissipating energy in the resistive load. During the third quarter cycle, the method provides a negative charging current path from the return terminal to the charging terminal through the series capacitance and the resistive load to transfer energy from the flux waveform to the resistive load. The method further includes interrupting the negative charging current path at a predetermined point in the negative half-cycle. During the fourth quarter cycle, the method provides a negative injection current path from the charging terminal to the injection terminal through the series capacitance and the resistive load to transfer energy to the input source while simultaneously dissipating energy in the resistive load.

In some implementations of the method, the input source includes a primary winding of a transformer and the output winding includes a secondary winding of the transformer. In various embodiments, the primary winding may have a first number of turns Np and the secondary winding may have a second number of turns Ns. The number of turns between the injection tap and the return terminal may have k*Ns turns, where k<1. During the first quarter cycle, energy input to the primary winding may couple to the secondary winding with an effective primary-to-secondary turns ratio of Np:Ns. During the second quarter cycle, energy input to the secondary winding at the injection terminal may couple to the primary winding with an effective primary-to-secondary turns ratio of Np:k*Ns.

In various embodiments, the tap may be located at an electrically symmetric center-point between the charging terminal and the return terminal. The tap may couple to the output winding at a point between about twenty to fifty percent of the electrical distance between the charging terminal and the return terminal, or at a point between about fifty to eighty percent of the electrical distance between the charging terminal and the return terminal.

The input source may include a rotating magnetic field source.

In some examples, the method may include a prime mover operably coupled to rotate the magnetic field source. During the second and/or fourth quarter cycles, the transfer of energy to the input source may include an assisting torque to the prime mover. The prime mover may include a combustion engine, or an electric motor, for example.

Various embodiments may achieve one or more advantages. For example, some embodiments may improve a system efficiency and/or reduce the cost of energy consumption by returning some energy back to an input source, for example, in the form of an assisting torque that reduces the average torque load on a prime mover. In some embodiments, power may be delivered to a resistive load during all four quarter cycles of magnetic excitation coupled to the output winding, while some energy may be advantageously returned to the input during the second portions of the positive and/or negative quarter cycles. In various implementations, a real power component may be more efficiently delivered to an AC or a DC load using, for example, transformers or generators that couple energy to the load via an output winding with current conditioned by a switching network and series capacitance, in accordance with various embodiments described herein.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, FIG. 1 briefly introduces an implementation of an exemplary Switched Energy Resonant Power Supply System (SERPS). Second, with reference to FIG. 2, the discussion turns to a block diagram view of an exemplary SERPS. Exemplary embodiments that illustrate a half-wave and full-wave SERPS is then discussed in FIGS. 3-4. With reference to FIGS. 5-8, the discussions turns to graphical representations of exemplary SERPS output plots. Exemplary embodiments of exemplary SERPS connected in operation with different power sources is discussed in FIGS. 9-11. With reference to FIG. 12, a graph illustrating a timing for EMF waveform using an exemplary SERPS is discussed. Exemplary embodiments of exemplary SERPS configurations are discussed in FIGS. 13-16. Finally, with reference to FIG. 17, an exemplary switch control system for use with an exemplary half wave SERPS is discussed.

Figure 1:
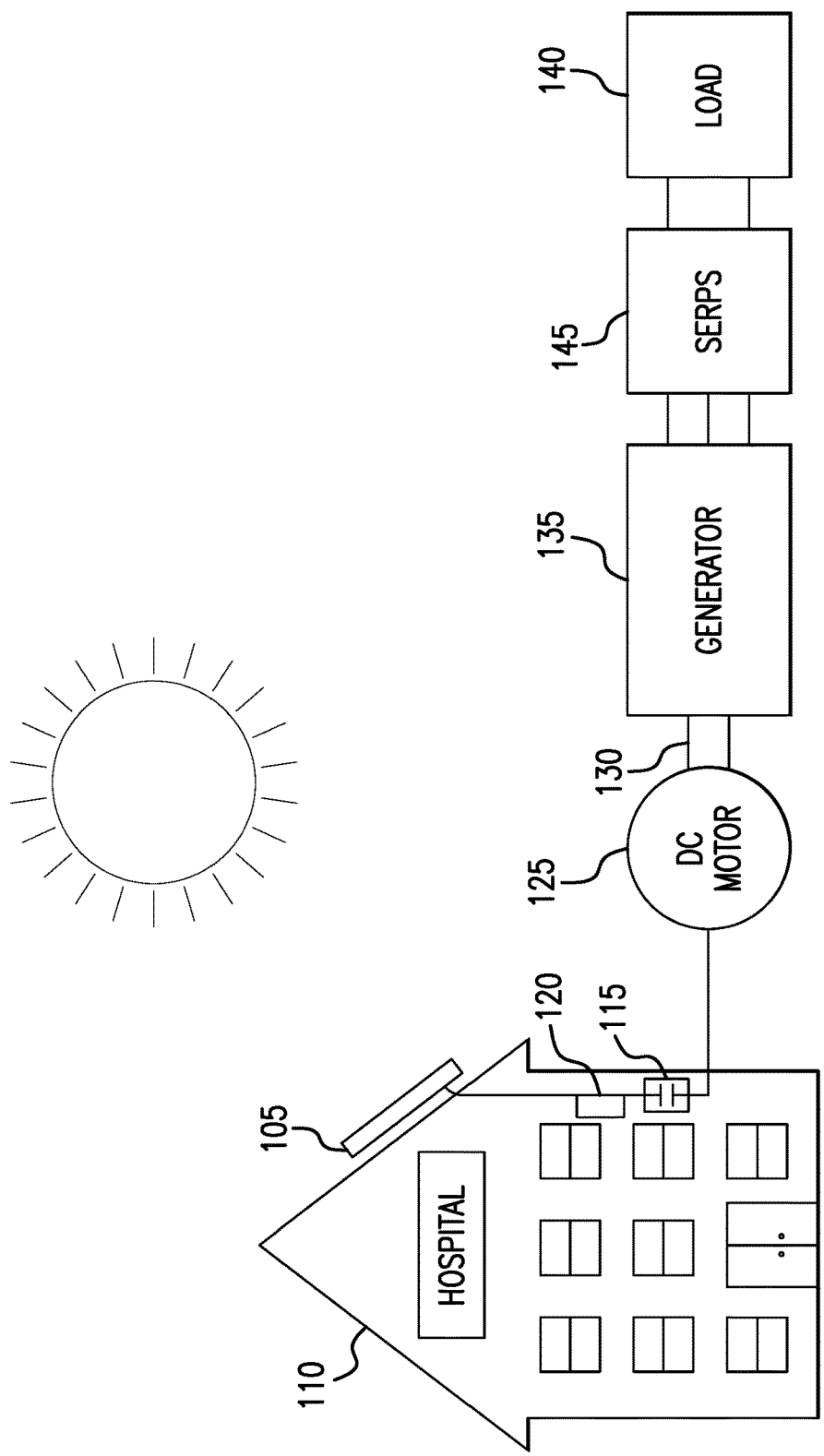
FIG. 1 depicts a block diagram view of a hospital connected to an exemplary Switched Energy Resonant Power Supply System (SERPS).

FIG. 1 depicts a block diagram view of a hospital connected to an exemplary Switched Energy Resonant Power Supply System (SERPS). A solar panel 105 mounts on a hospital 110 to store solar energy from the sun. The solar panel charges an energy storage device 115 via a charge controller 120. The energy storage device 115 supplies a prime mover 125 operating power to rotate a primer mover shaft 130. In the depicted example, the prime mover 125 is a DC motor. As the prime mover shaft 130 rotates, the prime mover shaft 130 supplies mechanical torque to rotate an armature of a generator 135 to generate an energy output. A load 140 receives the output energy via a SERPS 145. The SERPS 145 may control a flow of current in accordance with a periodic cycle. During a first portion of the periodic cycle, the SERPS 145 may permit current to flow such that power dissipates in the load 140 while an energy storage device charges. During a second portion of the periodic cycle, the SERPS 145 may permit current to flow such that the energy stored in the energy storage device during the first portion dissipates across the load 140 while returning energy to the generator 135. The returned energy may reduce an average torque output requirement of the prime mover by introducing an assisting torque during the second portion of the periodic cycle.

In various embodiments, the load 140 is at least in part resistive. The load 140 may be, for example, an active load with a switching regulator to step up an energy output. The load 140 may be an electrical device, such as a computer, for example. A HVAC system may also be the load 140. In some embodiments, the load 140 may be a micro grid configured to power a contained area.

In some embodiments, a power source, other than the solar panels, may power the prime mover 125. For example, wind power generated by wind turbines may provide operating power to the prime mover 125. A non-renewable energy source, such as a diesel fuel, alone or in combination with a renewable energy source, for example, may power the prime mover 125 to operate the prime mover shaft 130.

In some embodiments, the prime mover 125 may be an electric motor, for example. The prime mover 125 may be an AC motor that draws operating power from an AC power line or from a DC-to-AC inverter, for example. In some embodiments, a steam turbine may serve as the prime mover 125.

Figure 2:
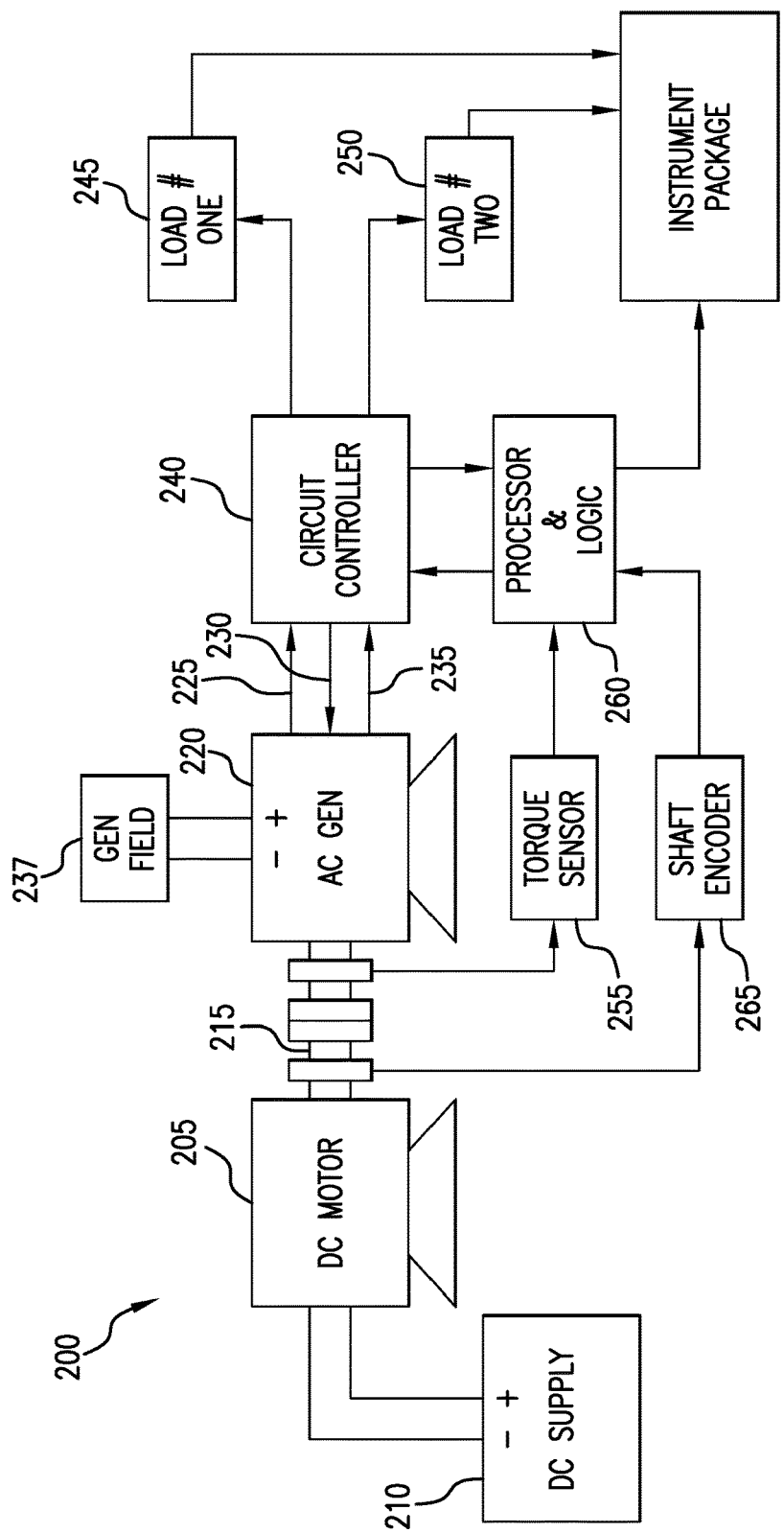
FIG. 2 depicts a block diagram view of an exemplary SERPS.

FIG. 2 depicts a block diagram view of a power supply system having an exemplary SERPS. A power supply system 200 includes a DC motor 205 that draws power from a power source 210. In operation, the DC motor 205 rotates a drive shaft 215 such that an AC generator 220 generates a bidirectional current across a secondary winding (not shown). The AC generator 220 includes an output winding having a charging terminal 225, an injection terminal 230, and a return terminal 235. A generator field power supply 237 supplies the AC generator 220 a DC current to generate a magnetic field in the armature of the AC generator 220. The generator field power supply 237 may adjust the voltage supplied to the AC generator 220 to change the intensity of the magnetic field, for example. The terminals 225-235 connect to a SERPS-configured circuit controller 240. The circuit controller 240 permits a current to flow from the output winding to a first load 245 and a second load 250. The circuit controller 240 may control a flow of current in accordance with a periodic cycle, for example. During a first portion of the periodic cycle, the circuit controller 240 may direct current to flow from the charging terminal 225 to the return terminal 235. During a second portion of the periodic cycle, the circuit controller 240 may direct current to flow into a center tap of the AC generator 220.

In the depicted example, a torque sensor 255 connects to the drive shaft 215 to detect a mechanical torque of the drive shaft 215. The torque sensor 255 transmits the detected mechanical torque data to a processor and logic controller 260. The processor and logic controller 260 may generate commands to the circuit controller 240 in response to the received detected mechanical torque, for example. A shaft encoder 265 connects to the drive shaft 215 to convert the angular position of the drive shaft 215 to an analog or digital signal that may be transmitted to the processor and logic controller 260. The processor and logic controller 260 may generate commands to the circuit controller 240 in response to the received angular position of the drive shaft 215, for example. The processor and logic controller 260 may transmit information to an instrument package 270. The instrument package 270 further receives information from the loads 245-250. The instrument package 270 may monitor one or more parameters, such as input power, output power, shaft speed, frequency, wattage and overall efficiency, for example, to determine an overall efficiency of the power supply system 200.

In some embodiments, switching operations performed by the circuit controller 240 may be bypassed, for example, to permit the power supply system 200 to function like a standard motor-generator set. The AC generator 220 may be a single-phase alternator, for example.

An exemplary embodiment with aspects the may be related to the power supply system 200 is described in further detail with reference, for example, to at least FIG. 1 of U.S. Provisional Application Ser. No. 62/415,226, titled "Switched Energy Resonant Power Supply," filed by James F. Murray III, on Oct. 31, 2016, the entire disclosure of which is incorporated by reference herein.

Figure 3:
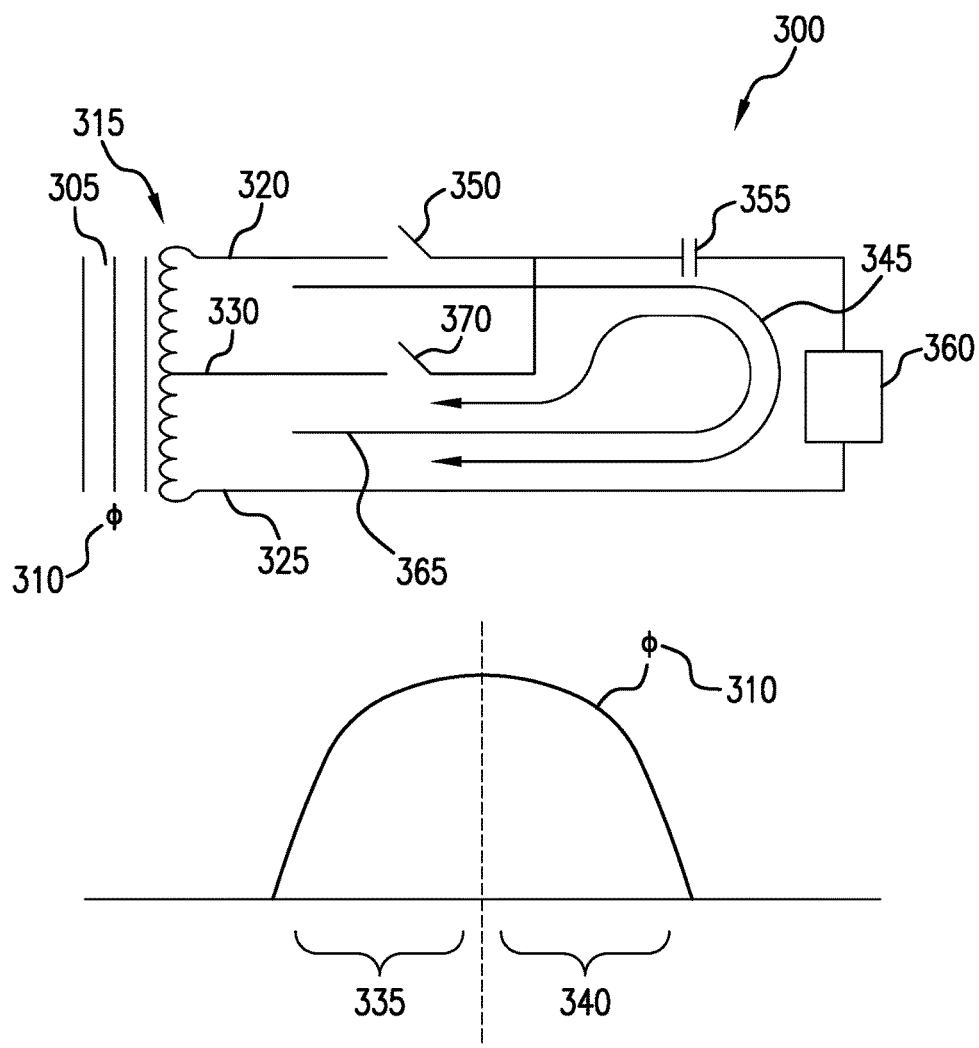
FIG. 3 depicts a schematic diagram of an exemplary half wave SERPS circuit.

FIG. 3 depicts a schematic diagram of an exemplary half wave SERPS circuit. A SERPS module 300 includes a magnetic flux path 305 having an excitation 310. The excitation 310 may be caused by a rotating magnetic field driven by a prime mover, for example. The magnetic flux path 305 couples magnetic flux to an output winding 315. The output winding 315 includes a charging terminal 320 and a return terminal 325. The output winding 315 further includes an injection terminal 330 at a tap between the charging terminal 320 and the return terminal 325. The excitation 310, as depicted, is a positive half wave cycle. The excitation 310 includes a first quarter cycle 335 and a second quarter cycle 340. In some embodiments, the excitation 310 may be imparted by a unidirectional current in a transformer winding (not shown) that is also coupled to the magnetic flux path 305.

A current charging path 345 travels from the charging terminal 320, through the capacitor 355 and the load 360, and to the return terminal 325 when a current charging switch 350 is closed. The current charging path 345 travels through a series capacitor 355 and a resistive load 360.

A current injection path 365 travels from the return terminal 325, through the load 360 and the capacitor 355, and to the injection terminal 330 when the current charging switch 350 is open and a current injection switch 370 is closed.

In an illustrative example, the circuit controller 240, with reference to FIG. 2, may close the current charging switch 350 to permit a charging current to flow along the current charging path 345. The charging current may flow from the charging terminal 320 through the series capacitor 355 and the resistive load 360 to the return terminal 325 during the first quarter cycle 335, for example. As such, the charging current may charge the series capacitor 355 during the first quarter cycle 335. The circuit controller 240, in response to the first quarter cycle 335 ending and the second quarter cycle 340 beginning, may open the current charging switch 350 and close the current injection switch 370 to permit an injection current to flow along the injection current path 365. The injection current may flow from the return terminal 325 to the injection terminal 330 such that the series capacitor 355 discharges through the resistive load 360 and into the tap at the injection terminal 330. In an illustrative example, the tap may be at an open circuit voltage below the voltage across the capacitor 355 thereby allowing current to flow in the direction of the current injection path 365.

An exemplary embodiment with aspects the may be related to the SERPS module 300 is described in further detail with reference, for example, to at least FIG. 2 of U.S. Provisional Application Ser. No. 62/267,170, titled "Switched Energy Resonant Power Supply," filed by Paul Babcock, et al., on Dec. 14, 2015, the entire disclosure of which is incorporated by reference herein.

Figure 4:
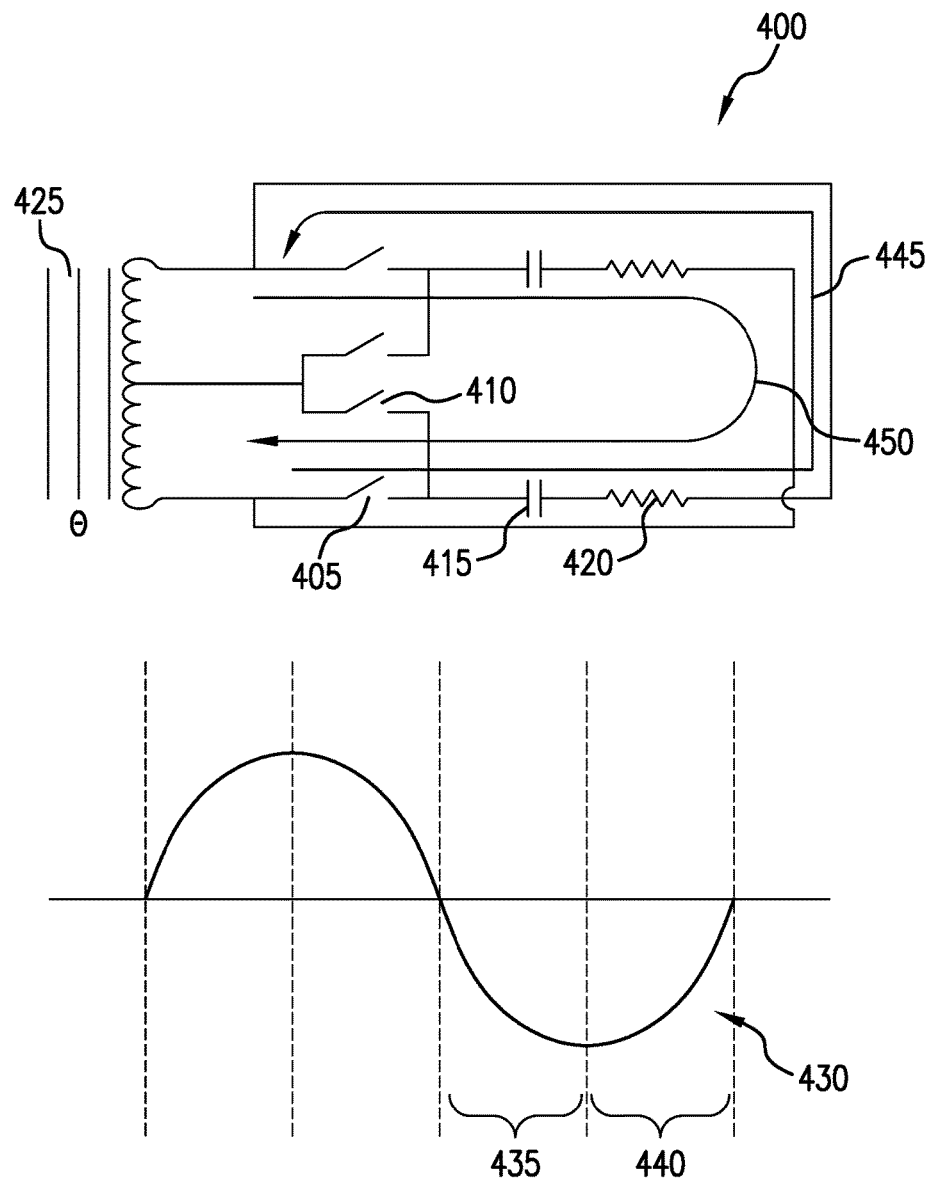
FIG. 4 depicts a schematic diagram of an exemplary full wave SERPS circuit.

FIG. 4 depicts a schematic diagram of an exemplary full wave SERPS circuit. With reference to FIG. 3, a SERPS module 400 introduces a current charging switch 405 and a current injection switch 410 into the SERPS module 300. The SERPS module 400 further introduces a series capacitor 415 and a resistive load 420. An excitation 425 is a full AC waveform. The excitation 425 includes positive half wave cycle (e.g., the excitation 310) and a negative half wave cycle 430. The negative half wave cycle 430 includes a first negative quarter cycle 435 and a second negative quarter cycle 440.

During the first negative quarter cycle 435, with reference to FIG. 2, the circuit controller 240 may close the current charging switch 405 to permit a charging current to flow along the current charging path 445. The charging current may flow from a return terminal (e.g., the return terminal 325) through the series capacitor 415 and the resistive load 420 to a charging terminal (e.g., the charging terminal 320), for example. The negative charging current may charge the series capacitor 415 during the first negative quarter cycle 435. The circuit controller 240, in response to the first negative quarter cycle 435 ending and the second negative quarter cycle 440 beginning, may open the current charging switch 405 and close the current injection switch 410 to permit an injection current to flow along an injection current path 450. The injection current may flow from the charging terminal to the injection terminal (e.g., the injection terminal 330) such that the series capacitor 415 discharges through the resistive load 420 and into the tap at the injection terminal.

In various embodiments, the SERPS module 400 operates during the negative half cycle, in a manner similar to the SERPS module 300 during the positive half wave cycle of the AC waveform. The SERPS module 400 may advantageously provide power across the resistive loads 420, 360 during both the positive and negative half wave cycles of the AC waveform, for example. The return current injected into a winding tap (e.g., the injection terminal 330) via the injection terminal may reduce prime mover input power requirement by producing an assisting torque during the second portions of both the positive and the negative half wave cycles of the AC waveform.

In some embodiments, with reference to FIG. 2, the processor and logic controller 260 may commence a timer to determine the passage of a predetermined threshold, such as ninety electrical degrees, for example. In response to reaching the predetermined threshold, the processor and logic controller 260 may instruct the circuit controller 240 to coordinate the current charging switches and the current injection switches to direct the flow of current as required to produce the desired effect of an assisting torque.

Figure 5:
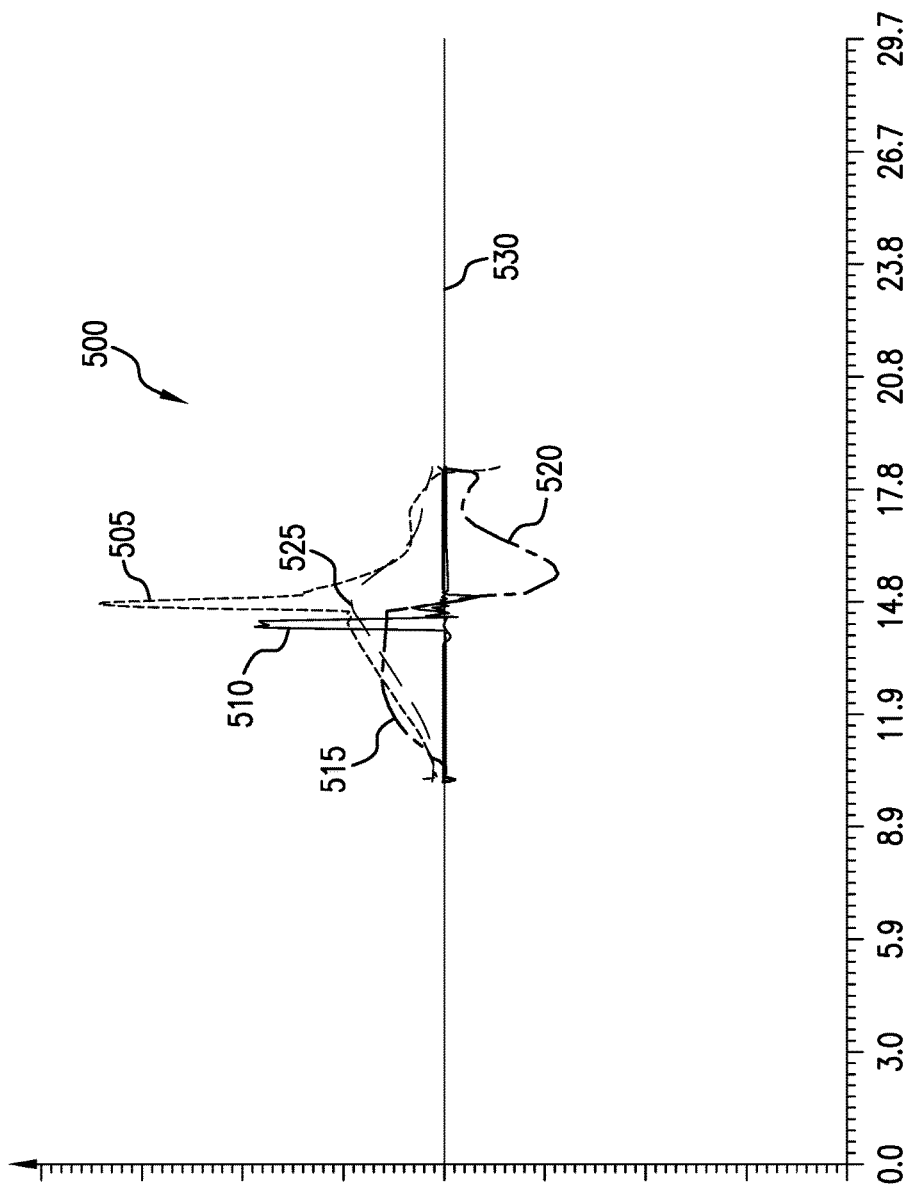
FIG. 5 depicts a graph illustrating generator voltage and current of an exemplary SERPS during a positive half cycle.

FIG. 5 depicts a graph illustrating generator voltage and current of an exemplary SERPS during a positive half cycle. The graph 500 illustrates a waveform 505 for a generator terminal voltage. The generator terminal voltage waveform 505 illustrates a sudden and substantial voltage peak after the passage of a ninety-degree marker 510. The voltage peak may be associated with a rapid reversal of a current from a positive polarity 515 to a negative polarity 520. The rapid reversal of the current may be in conjunction with the discharge of the capacitor (e.g., the capacitor 350). The graph 500 further depicts a capacitor voltage 525 and a zero line 530.

Figure 6:
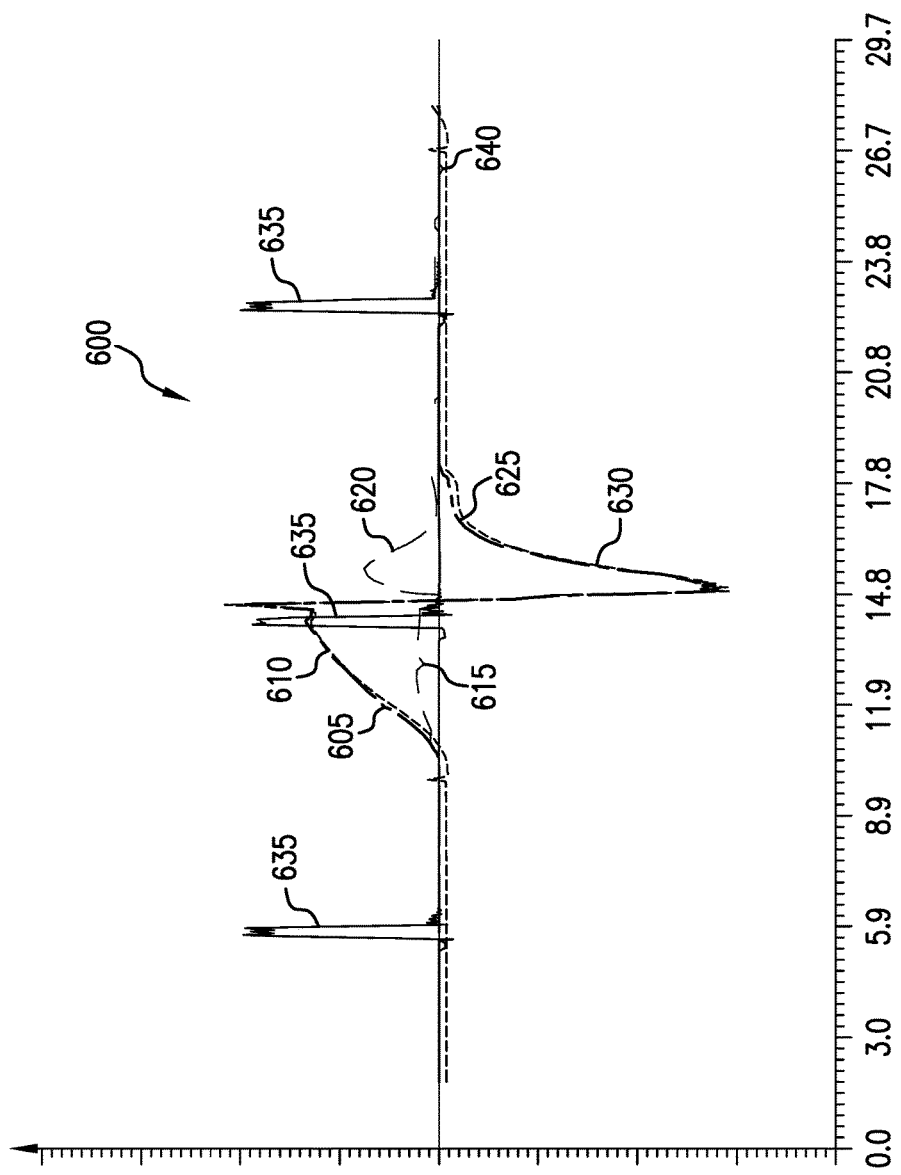
FIG. 6 depicts a graph illustrating system power, watts, and VARS of an exemplary SERPS during a positive half cycle.

FIG. 6 depicts a graph illustrating system power, watts, and VARS of an exemplary SERPS during a positive half cycle. The graph 600 illustrates a volt-amperes curve 605, a volt-amperes reactive curve 610 during a charging cycle, a wattage 615 dissipated in the load resistor during charging, a wattage 620 dissipated in the load resistor during discharge, a discharge volt-amperes curve 625, and a discharge volt-amperes reactive curve 630. The graph 600 further illustrates a multitude of repeating posts 635 as representative of predetermined intervals, such as ninety electrical degrees, for example. The graph 600 includes a zero line 640.

As depicted, the curves 605-630 are in phase with each other. As such, curves 605-615 illustrate a positive cycle associated with a charging function while the curves 625-630 illustrate a negative cycle associated with a discharging function. The wattage 620 represents a dissipative wattage above the zero line 640 as a result of a discontinuity created between charging and discharging functions of a SERPS (e.g., the SERPS module 400). The volt-amperes reactive curve 605 represents the non-dissipative wattage required to charge a capacitor (e.g., the capacitor 350) while the discharge volt-amperes reactive curve 630 represents the dissipative resistor wattage in the resistive load 360 plus power returned to the injection terminal 330, for example.

Figure 7:
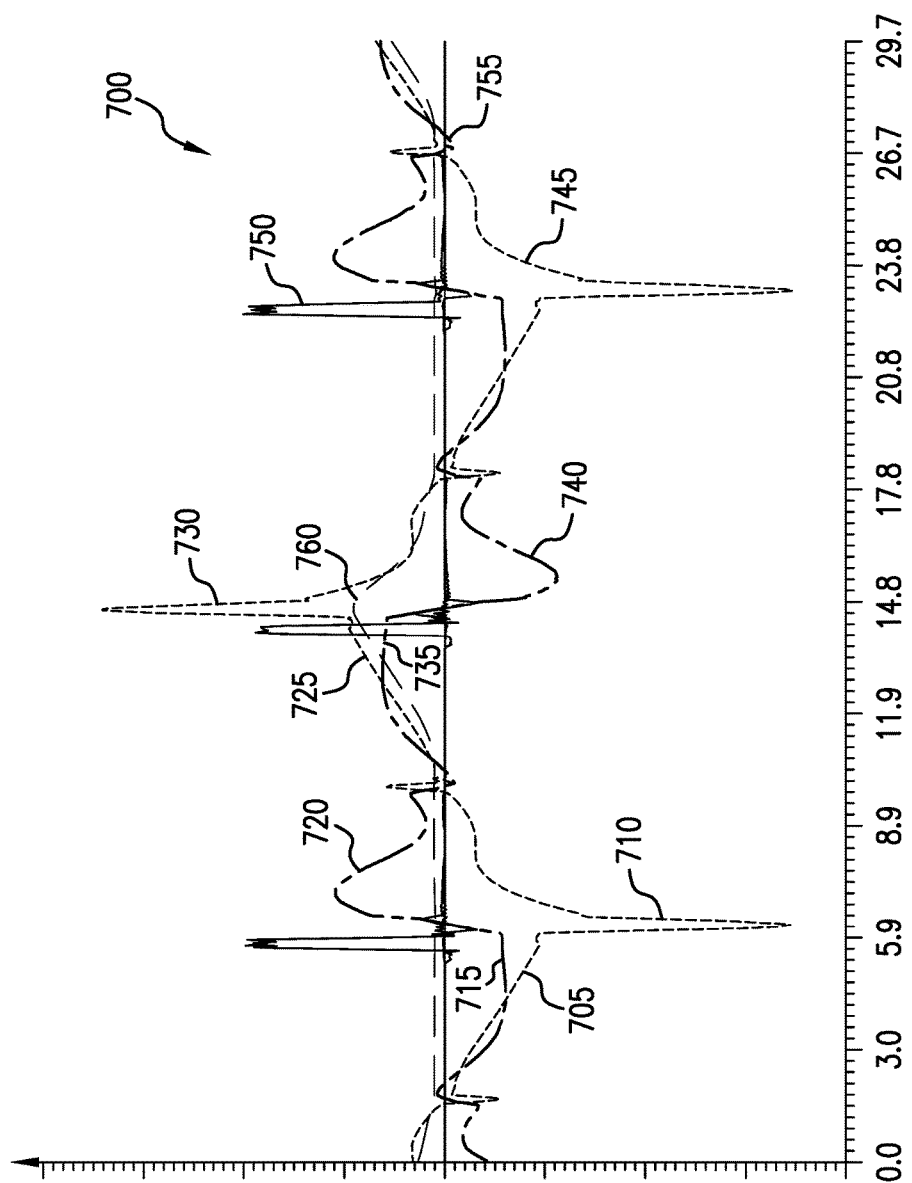
FIG. 7 depicts a graph illustrating a generator voltage and current during one and a half electrical cycles using an exemplary SERPS.

FIG. 7 depicts a graph illustrating a generator voltage and current during one and a half electrical cycles using an exemplary SERPS. A graph 700 illustrates a succession of voltage and current cycles associated with a SERPS. As depicted, the graph 700 starts during a first negative cycle. The graph 700 includes, in the first negative cycle, a negative charging voltage 705, a negative discharging voltage 710 and a negative charging current 715 and a negative discharging current 720. A first positive cycle follows the first negative cycle. In the first positive cycle, the graph 700 includes a positive charging voltage 725, a positive discharging voltage 730, a positive charging current 735, and a positive discharging current 740. A second negative cycle follows the first positive cycle. The half wave 745 illustrates the start of the second negative cycle. The graph 700 further includes ninety-degree markers 750 and a zero line 755. A curve 760 representing a positive capacitor voltage is included for illustrative purposes.

Figure 8:
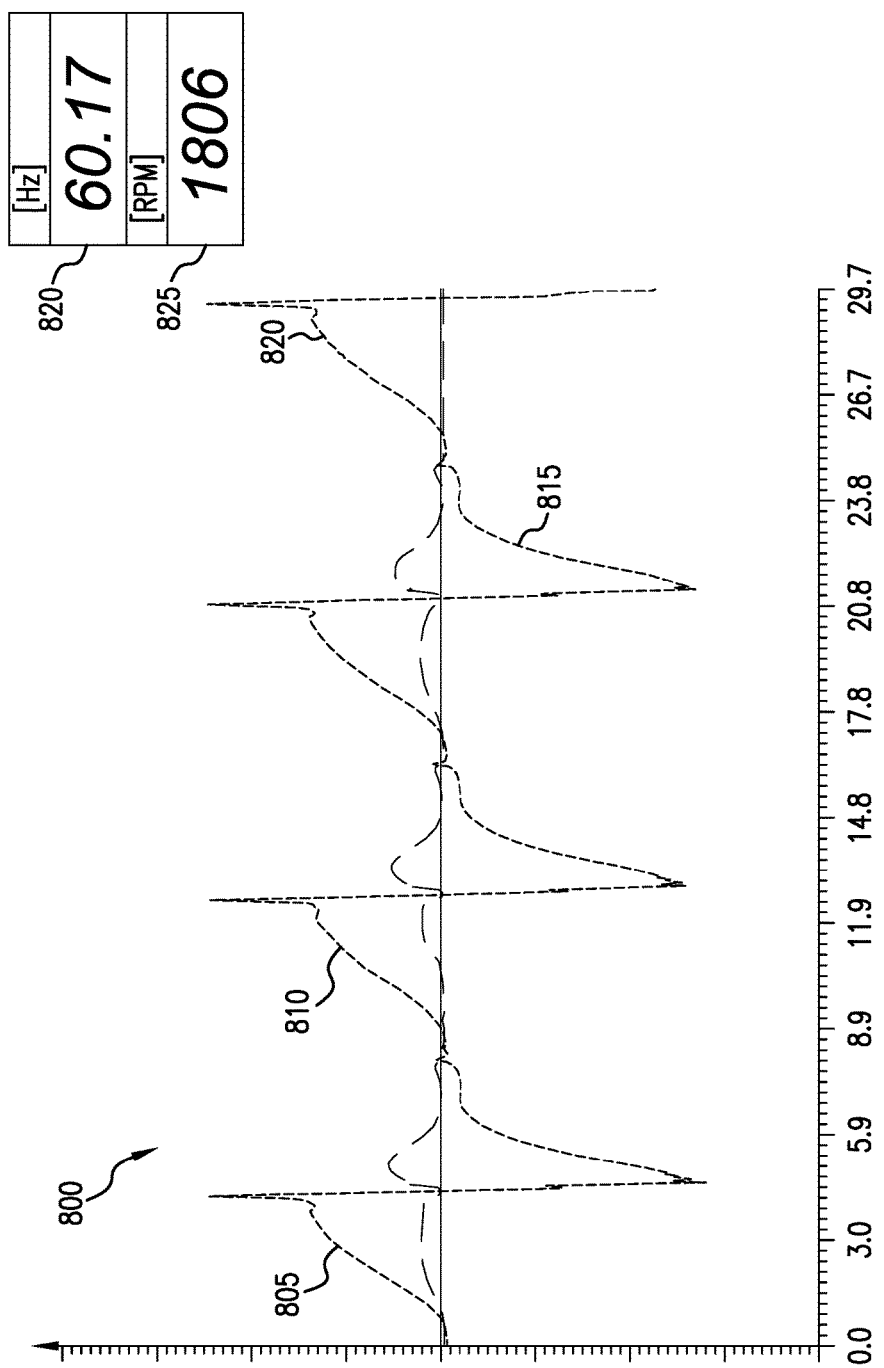
FIG. 8 depicts a generator output power during two consecutive electrical cycles using an exemplary SERPS.

FIG. 8 depicts a generator output power during two consecutive electrical cycles using an exemplary SERPS. The graph 800 includes pulses 805-820. The pulses 805-810 represent a first SERPS cycle. The pulse 805 represents the negative charge-discharge cycle while the pulse 810 represents the positive charge-discharge cycle. The pulses 815-820 represent a second SERPS cycle. The pulse 815 represents the negative charge-discharge cycle while the pulse 820 represents the positive charge-discharge cycle. As depicted, the graph 800 is representative of a two SERPS cycles operating at a generator frequency 820 of 60 Hz and a shaft speed 825 of 1800 RPM.

Figure 9:
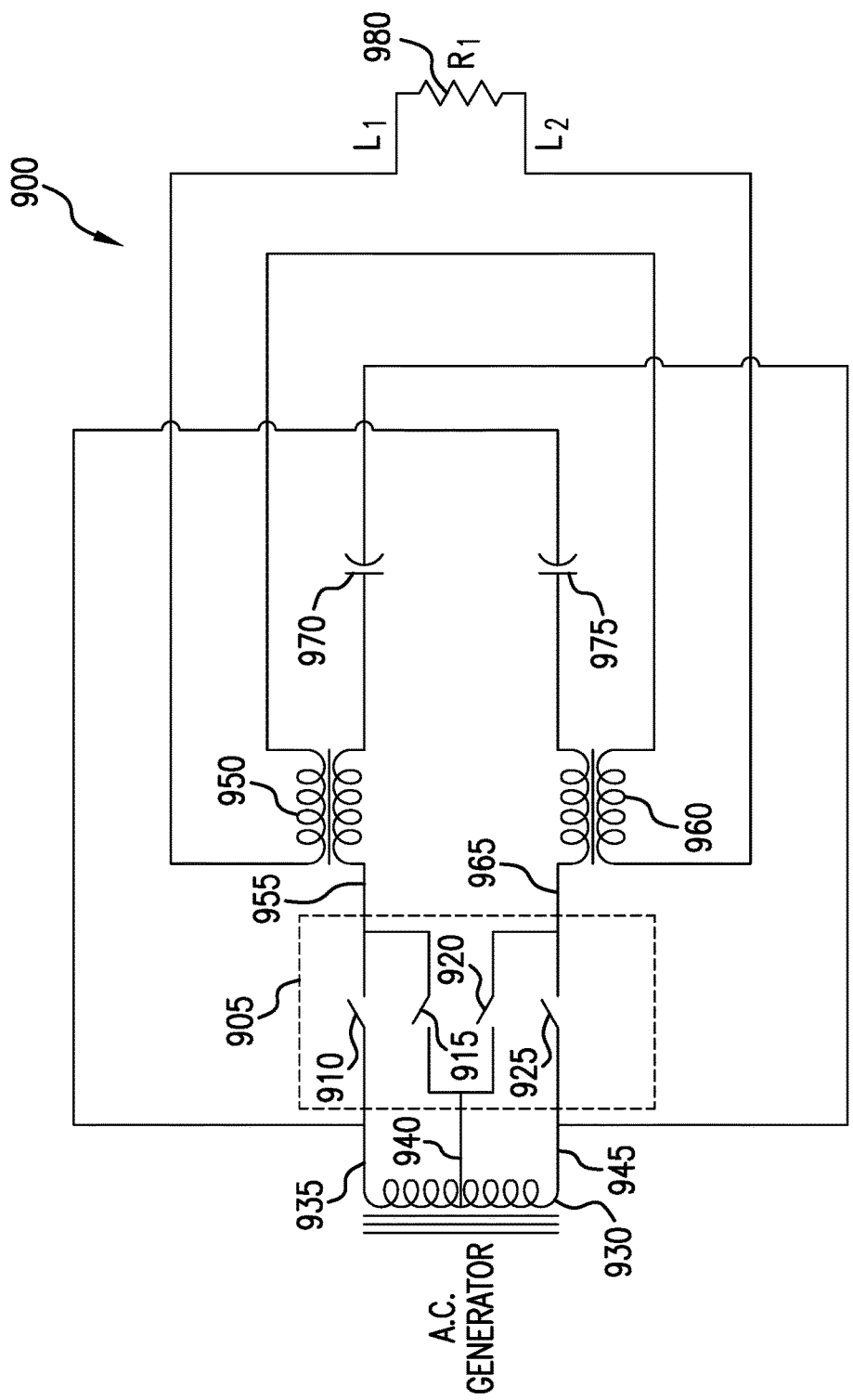
FIG. 9 depicts a schematic view of two SERPS power output channels combined to supply a single resistive load using transformers.

FIG. 9 depicts a schematic view of two SERPS power output channels combined to supply a single resistive load using transformers. A SERPS 900 includes a switching network 905. The switching network 905 includes switches 910-925. The switching network 905 connects to an output winding 930 at a charging terminal 935, an injection terminal 940, and a return terminal 945. The switching network 905 connects to a transformer 950 at a terminal 955. The switching network 905 further connects to a second transformer 960 at a terminal 965. Each of the transformers 950, 960 includes a primary winding and a secondary winding. The primary winding may be a low impedance winding, such as, for example, a winding designed to accommodate low voltages and high currents. The secondary winding may be configured to accommodate high voltages and low currents, for example. As depicted, the transformers 950, 960 are connected such that each of the secondary windings are in additive series. The secondary windings may be connected in additive parallel in accordance with actual load requirements, for example.

Output stages of the SERPS 900 operate in push-pull fashion while charging and discharging a pair of energy storage devices 970, 975. As such, the energy storage devices 970, 975 deliver a combined output power to a resistive load 980. The switching network 905 may operate the switches 910-925 such that during a second quarter cycle of both a positive half wave and a negative half wave an injection current gets returned into the output winding 930 via the injection terminal 940.

Figure 10:
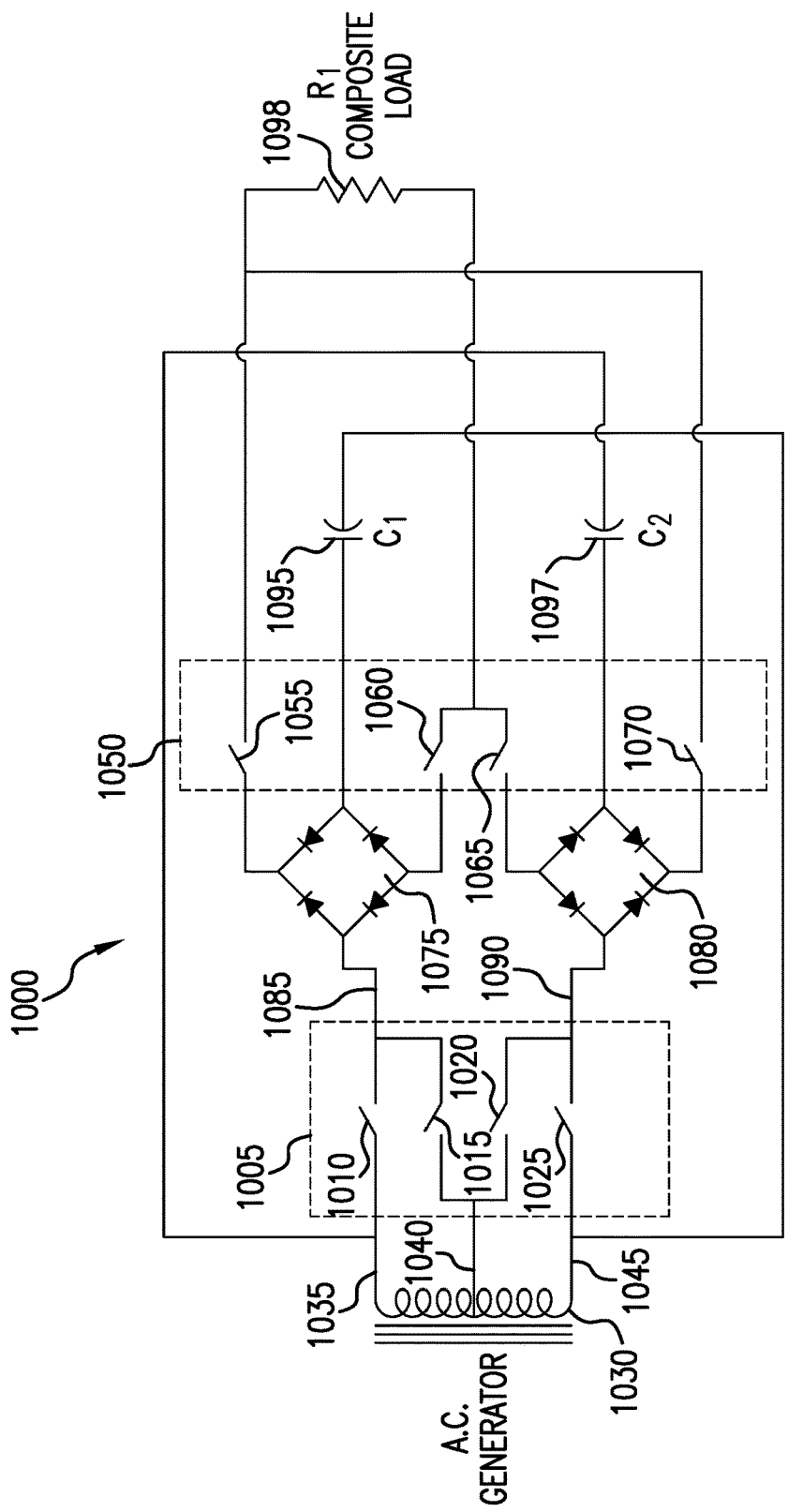
FIG. 10 depicts a schematic view of two SERPS power output channels combined to supply a single resistive load using electrical switching.

FIG. 10 depicts a schematic view of two SERPS power output channels combined to supply a single resistive load using electrical switching. A SERPS 1000 includes a first switching network 1005. The first switching network 1005 includes switches 1010-1025. The first switching network 1005 connects to generator output windings 1030 at a first terminal 1035, an injection terminal 1040, and a second terminal 1045. A second switching network 1050, which includes switches 1055-1070, connects to the first switching network 1005 via full wave rectifier bridges 1075, 1080. The full wave rectifier bridge 1075 connects at a terminal 1085 to the switches 1010-1015. The full wave rectifier bridge 1075 further connects to the switches 1055-1060 and an energy storage device 1095. The full wave rectifier bridge 1080 connects at a terminal 1090 to the switches 1020-1025. The full wave rectifier bridge 1080 further connects to the switches 1065-1070 and an energy storage device 1097. In various embodiments, the switches 1055-1070 are polarity controlled switches to prevent circulating current between the full-wave rectifiers 1075, 1080, for example.

In an illustrative example, in response to detecting a zero-crossing positive, a circuit controller (e.g., the circuit controller 240) may close the switch 1010. The circuit controller may further close the switches 1055-1060 to allow current to flow. The current may flow from the generator 1030 to the switch 1010, then to the full wave rectifier bridge 1075, and through the switch 1050 across a resistive element 1098. The current may then flow from the resistive element 1098 to the switch 1060 across the full wave rectifier bridge 1075 to charge the energy storage device 1095.

In response to completion of ninety electrical degrees, the circuit controller may open the switch 1010 and close the switch 1015, for example. The circuit controller may leave the switches 1055-1060 closed to allow the energy storage device 1095 to discharge through the full wave rectifier bridge 1075 to the switch 1055 and across the resistive element 1098. The current may then flow from the resistive element 1098 to the switch 1060 across the full wave rectifier bridge 1075 into the generator output windings 1030 via the injection terminal 1040. At the end of the next ninety electrical degrees, the circuit controller may open the switches 1010-1015 and the switches 1055-1060 as a negative half wave cycle begins.

In response to detecting a zero-crossing negative, the circuit may close the switch 1025. The circuit controller may further close the switches 1065-1070 to allow current to flow. The current may flow from the generator 1030 to the switch 1025, then to the full wave rectifier bridge 1080, and through the switch 1070 across the resistive element 1098. The current may then flow from the resistive element 1098 to the switch 1065 across the full wave rectifier bridge 1080 to charge the energy storage device 1097.

In response to completion of ninety electrical degrees, the circuit controller may open the switch 1025 and close the switch 1020, for example. The circuit controller may leave the switches 1065-1070 closed to allow the energy storage device 1097 to discharge through the full wave rectifier bridge 1080 to the switch 1070 and across the resistive element 1098. The current may then flow from the resistive element 1098 to the switch 1065 across the full wave rectifier bridge 1080 into the generator output windings 1030 via the injection terminal 1040. At the end of the next ninety electrical degrees, the circuit controller may open the switches 1020-1025 and the switches 1065-1070 as a positive half wave cycle begins.

Figure 11:
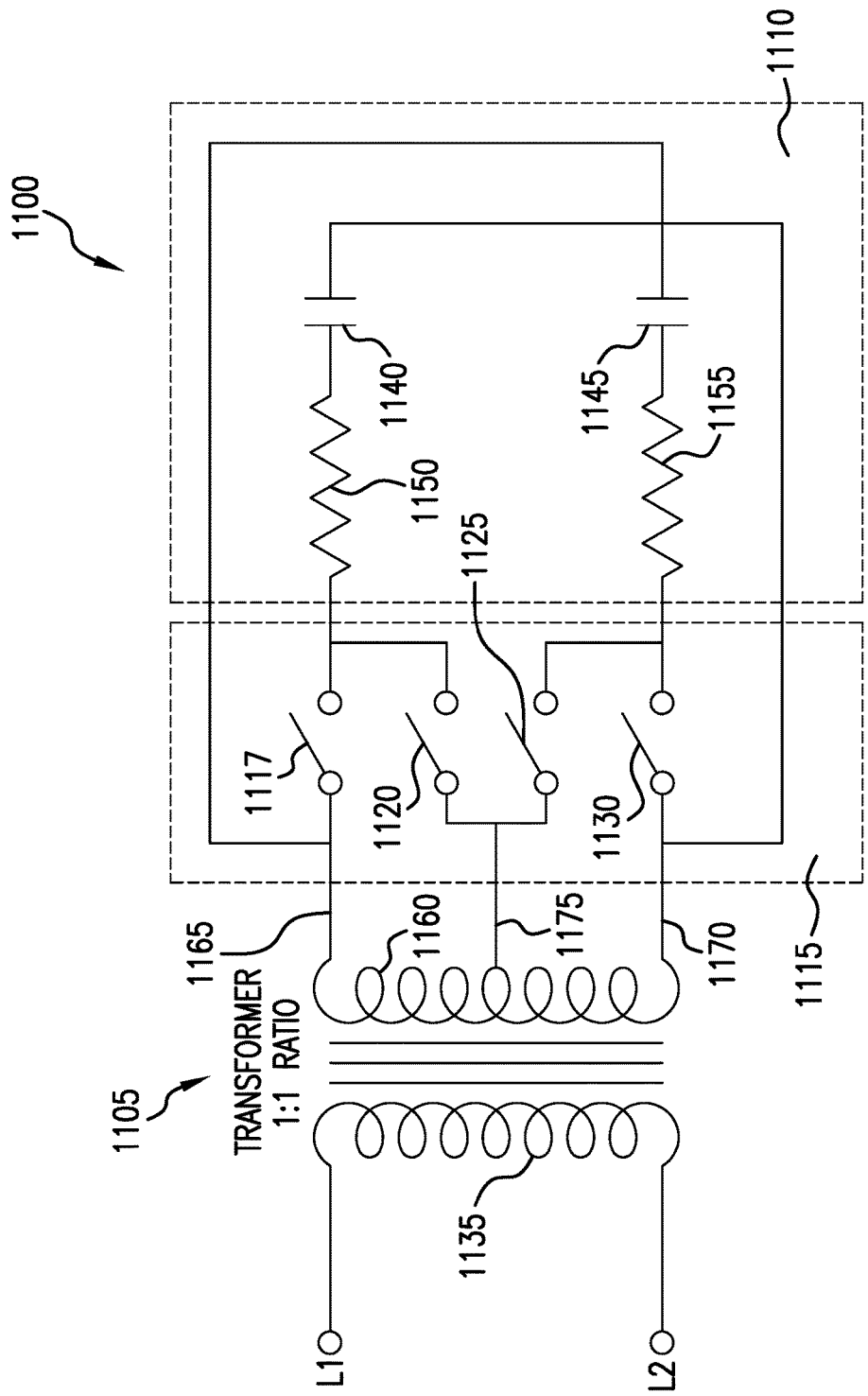
FIG. 11 depicts a schematic diagram of an exemplary full wave SERPS circuit using a transformer as the power source.
Figure 12:
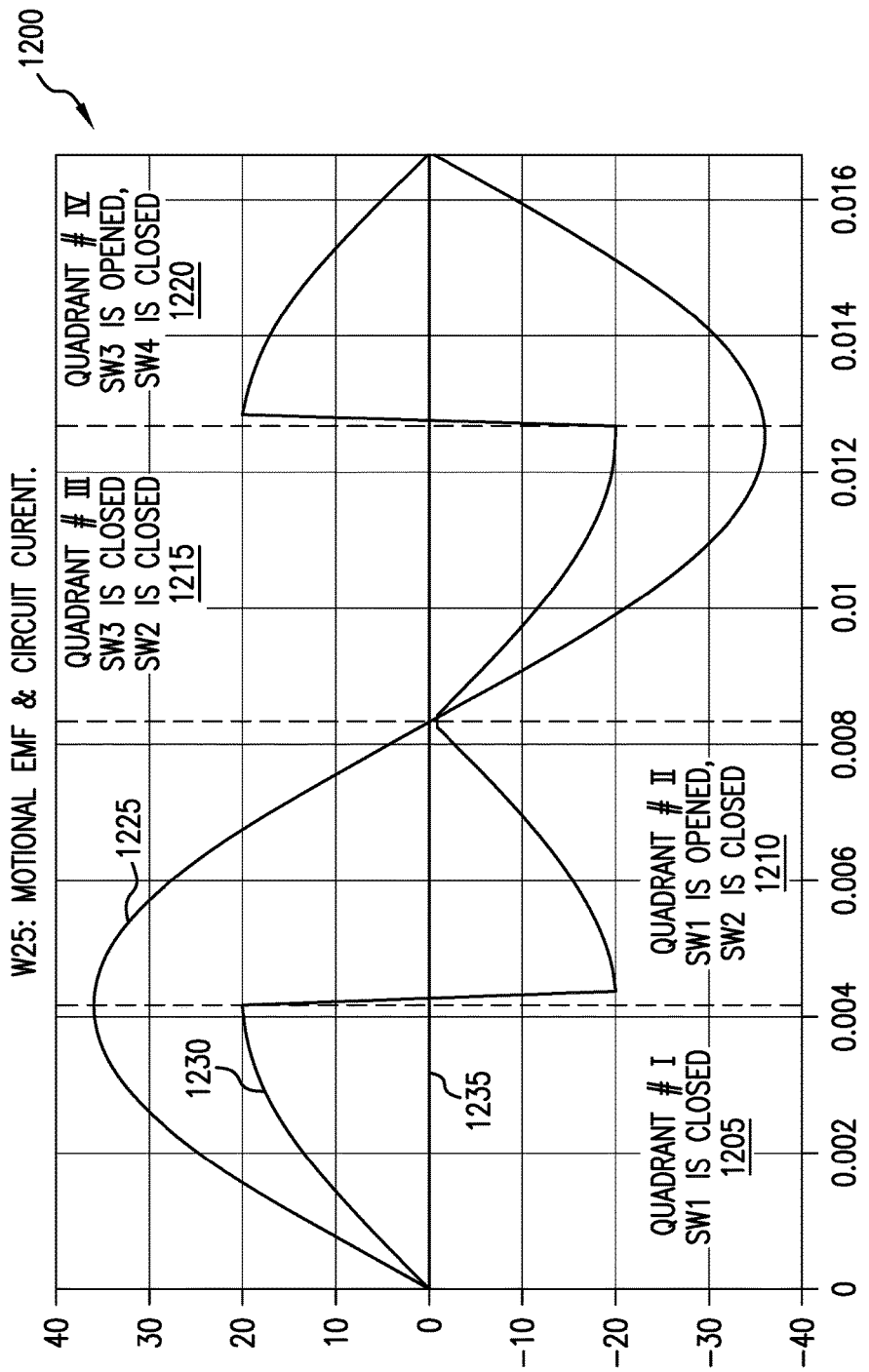
FIG. 12 depicts a graph illustrating a timing for an EMF waveform using an exemplary SERPS as applied to a generator.

FIG. 11 depicts a schematic diagram of an exemplary full wave SERPS circuit using a transformer as the power source. A SERPS 1100 includes a transformer 1105 connected to a load 1110 through a switching network 1115. The switching network 1115 includes switches 1117-1130. The transformer 1105 may transfer line power from a grid to the load 1110, for example. In such a scenario, a primary winding 1135 may be connected to 240 Volt Alternative-Current ("AC") line power, for example. As depicted, the load 1110 has two energy storage capacitors 1140, 1145 and two resistors 1150, 1155. During a positive voltage phase of the AC waveform, the switching network 1115 may switch in one resistor-capacitor pair 1150, 1140. And during a negative voltage phase of the AC waveform, the switching network 1115 may switch in the other resistor-capacitor pair 1155, 1145, for example. Both phases of the AC waveform may deliver power to the load using such a configuration. In various embodiments, a timing of the switches 1117-1130 may be adjusted as well as the value of the resistors to optimize the impedance of the load to the incoming power line. In various embodiments, the SERPS 1100 may return a portion of the stored power back to a grid, for example, on a quarter cycle basis to increase transformer efficiency.

The primary winding 1135 has a first number of turns (N1). The secondary winding 1160 has a second number of turns (N2) between a first terminal 1165 and a second terminal 1170. The secondary winding 1160 further includes an injection tap 1175. In the depicted embodiment, the first number of turns (N1) and the second number of turns (N2) equal each other. An effective turns ratio may change between charging and discharging states. For example, during a first quarter cycle of a positive half wave (charging state), the transformer 1105 has an effective turns ratio of 1-to-1 (N1:N2) between the first number of turns (N1) and the second number of turns (N2). During a second quarter of a positive half wave cycle (discharging state), the series capacitor 1150 may discharge (injection current) into the secondary winding 1160 via the injection tap 1175 reducing the effective number of turns (N2) by a proper fraction (k). The proper fraction (k) may be determined by dividing the number of turns between the second terminal 1170 and the injection tap 1175 by N2. Accordingly, during the discharging state, the effective turns ratio changes to N1:kN2, where k<1. As such, the secondary voltage reflected to the primary winding 1135 may be higher during the second quarter cycle than during the first quarter cycle due to the altered effective turns ratio, N1:kN2. In some implementations, the altered primary to secondary coupling may, for example, advantageously induce some power to flow back to the source during at least a portion of the second quarter cycle. When the primary winding is connected to a nearly ideal voltage source, for example, the altered turns ratio may induce, for example, an incremental increase in reflected current that flows back into the source, which may result in an effective reduction in average input power supplied by the input source to the SERPS-supplied load, for example. When the input source involves a prime mover rotating a magnetic field, for example, the altered turns ratio may induce, for example, an incremental assisting torque, which may result in an effective reduction in average input power supplied by the input source to the SERPS-supplied load, for example.

FIG. 12 depicts a graph illustrating a timing for an EMF waveform using an exemplary SERPS as applied to a generator. The graph 1200 illustrates four quadrants 1205-1220. The plot 1225 represents a motional electromotive force (EMF). The plot 1230 represents a circuit current. The line 1235 represents a zero line. As depicted, motional EMF 1225 and the circuit current 1230 are above the zero line 1235 while in the first quadrant 1205. Actions in the first quadrant 1205 may be in accordance with a first switch being closed. The motional EMF 1225 continues to be above the zero line 1235 while the circuit current 1230 is below the zero line 1235 while in the second quadrant 1210. The second quadrant 1210 may correspond to the first switch being open and a second switch being closed, for example.

The motional EMF 1225 and the circuit current 1230 are below the zero line 1235 while in the third quadrant 1215. Actions in the third quadrant 1215 may be in accordance with a third switch being closed. The motional EMF 1225 continues below the zero line 1235 while the circuit current 1230 is above the zero line 1235 while in the fourth quadrant 1220. The fourth quadrant 1220 may correspond to the third switch being open and a fourth switch being closed, for example.

Figure 13:
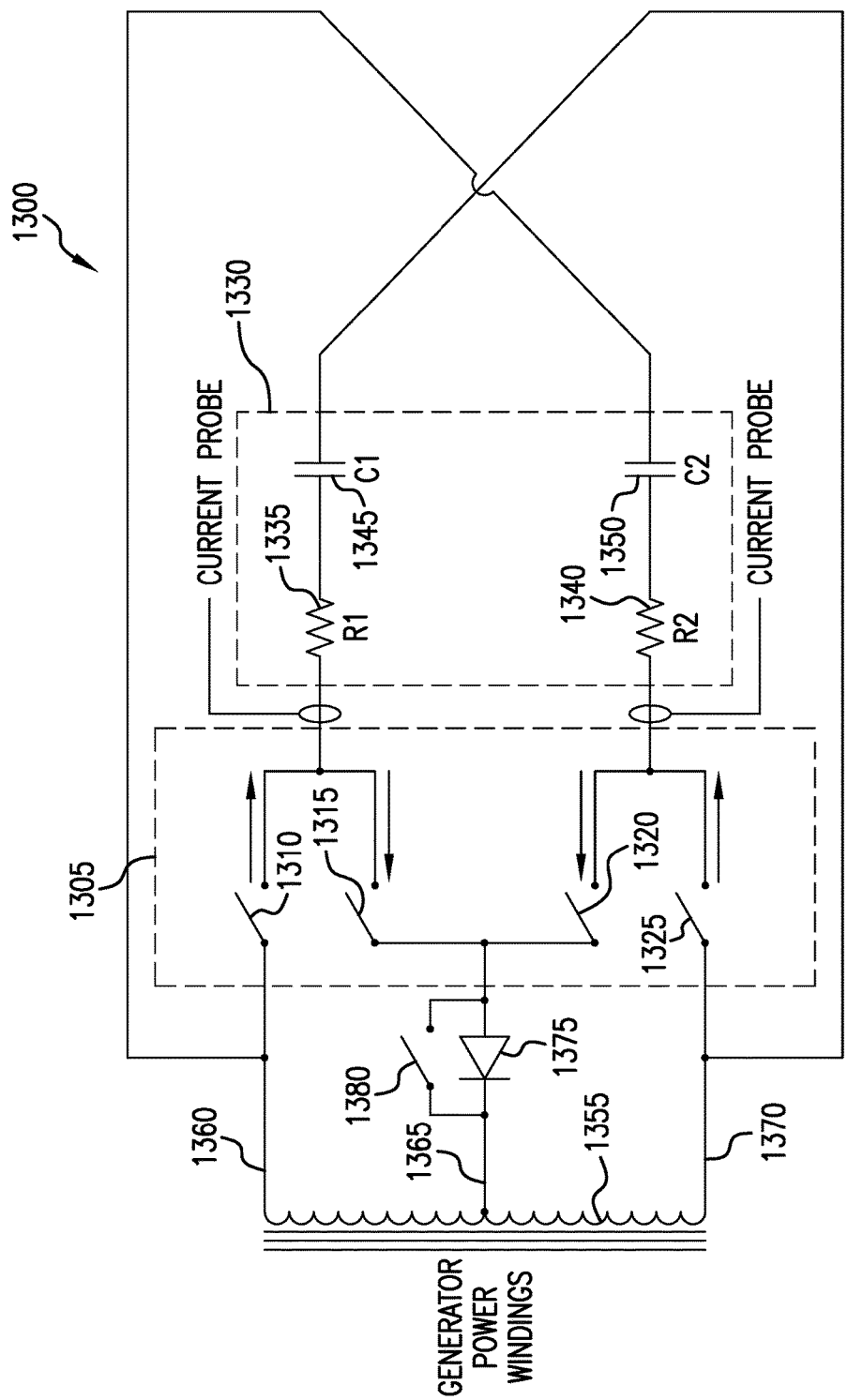
FIG. 13 depicts a schematic view of an exemplary full wave SERPS circuit utilizing a discharge rectifier.

FIG. 13 depicts a schematic view of an exemplary full wave SERPS circuit utilizing a discharge rectifier. A SERPS 1300 includes a switching network 1305 having switches 1310-1325. The SERPS 1300 further includes a load 1330 having two energy storage capacitors 1345, 1350 and two resistors 1335, 1340. An output winding 1355 connects to the switching network 1305 via a charging terminal 1360, an injection terminal 1365, and a return terminal 1370. A diode 1375 connects to the switches 1315-1320 at one end and to the injection terminal 1365 at another end. In some embodiments, the diode 1375 may cause inductive energy to appear as a voltage spike across the output windings 1355, for example. The resistance of diode 1375 may direct energy into the output windings 1355 to increase a voltage in the output winding 1355 itself.

When a bypass switch 1380 is closed to bypass the diode 1375 an immediate and automatic feedback may, for example, add an accumulated charge to the energy storage capacitors 1345, 1350 depending on the state of the switches 1310-1325. When the bypass switch 1380 is in the closed state, a higher voltage may accumulate in the capacitors 1345, 1350, which may, in some implementations, advantageously drive more returned power into a prime mover instead of the resistors 1335, 1340, for example.

Figure 14:
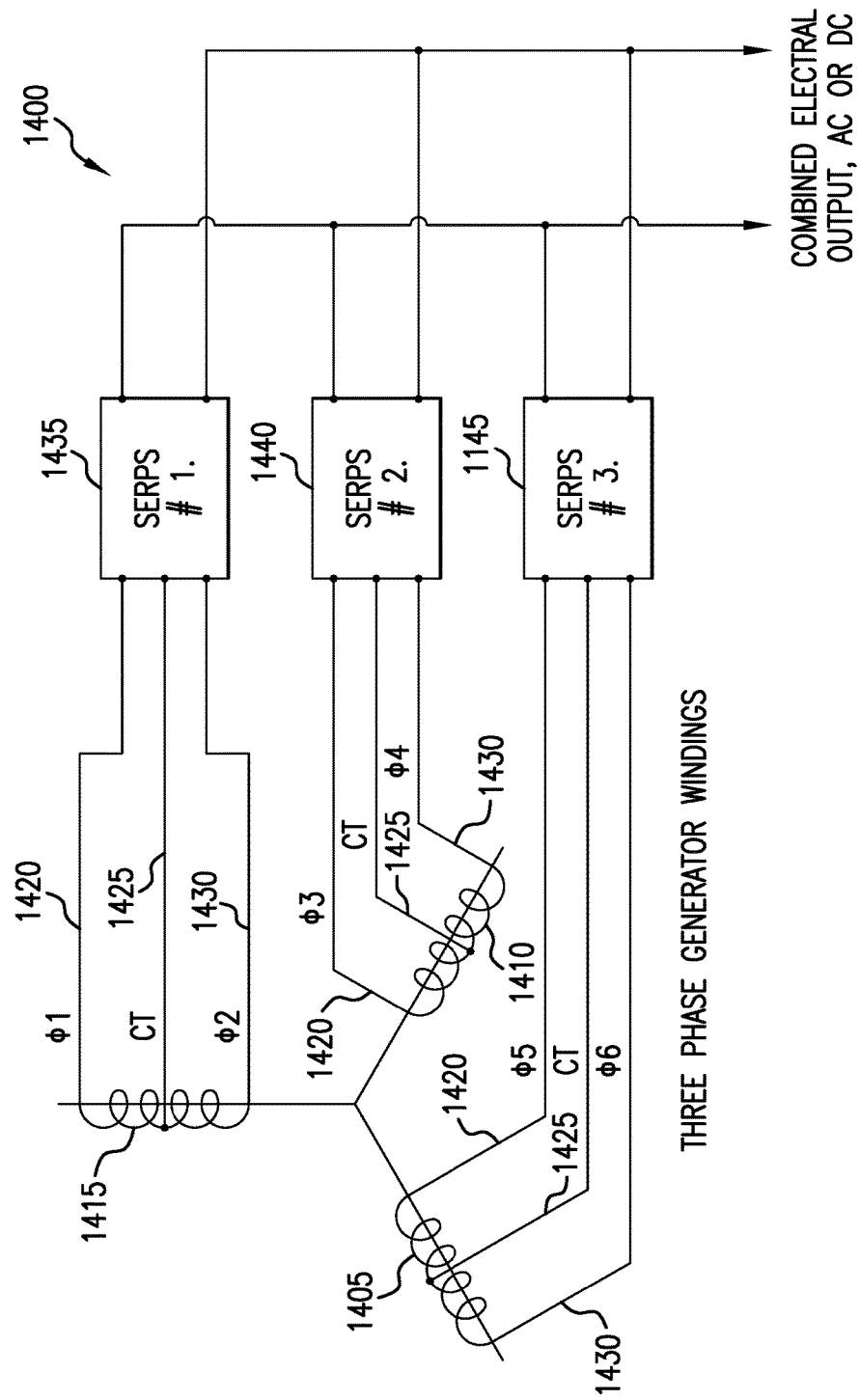
FIG. 14 depicts a schematic view of an exemplary SERPS configuration using a single three-phase generator and three SERPS circuits.

FIG. 14 depicts a schematic view of an exemplary SERPS configuration using a single three-phase generator and three SERPS circuits. A SERPS configuration 1400 includes three output generator windings 1405-1415. Each output generator winding 1405-1415 includes a charging terminal 1420, an injection tap 1425, and a return terminal 1430. Each output generator winding 1405-1415 connects to a SERPS 1435-1445, respectively, via the charging terminal 1420, the injection tap 1425, and the return terminal 1430. An output from each of the SERPS 1435-1445 may be combined to increase a power output from the SERPS configuration 1400. The output may be AC, for example.

Figure 15:
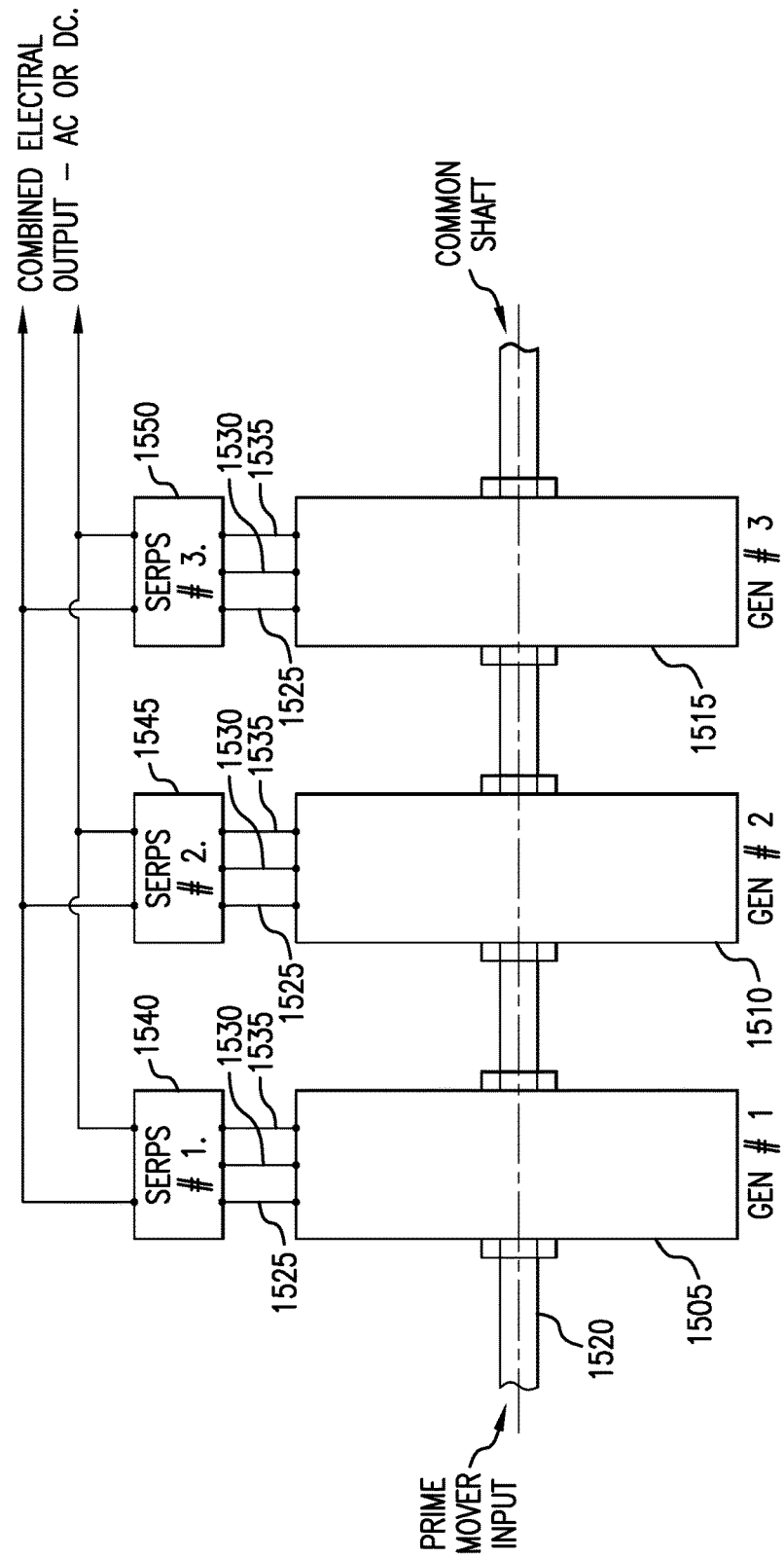
FIG. 15 depicts a schematic view of an exemplary SERPS configuration using three-phase electrical power derived from three single phase generators.

FIG. 15 depicts a schematic view of an exemplary SERPS configuration using three-phase electrical power derived from three single phase generators. A SERPS configuration 1500 includes three AC generators 1505-1515, each AC generator 1505-1515 being mechanically out of phase with each other by 120-degrees, sharing a prime mover 1520. Each AC generator 1505-1515 includes a charging terminal 1525 an injection tap 1530, and a return terminal 1535. Each AC generator 1505-1515 connects to a SERPS 1540-1550, respectively, via the charging terminal 1525, the injection tap 1530, and the return terminal 1535. An output from each of the SERPS 1540-1550 may be combined to increase a power output from the SERPS configuration 1500. Each SERPS 1540-1550 may recycle energy via the injection tap 1530 back into the AC generators 1505-1515, respectively, to generate a reverse torque to assist, or reduce the average load on, the prime mover 1520.

Figure 16:
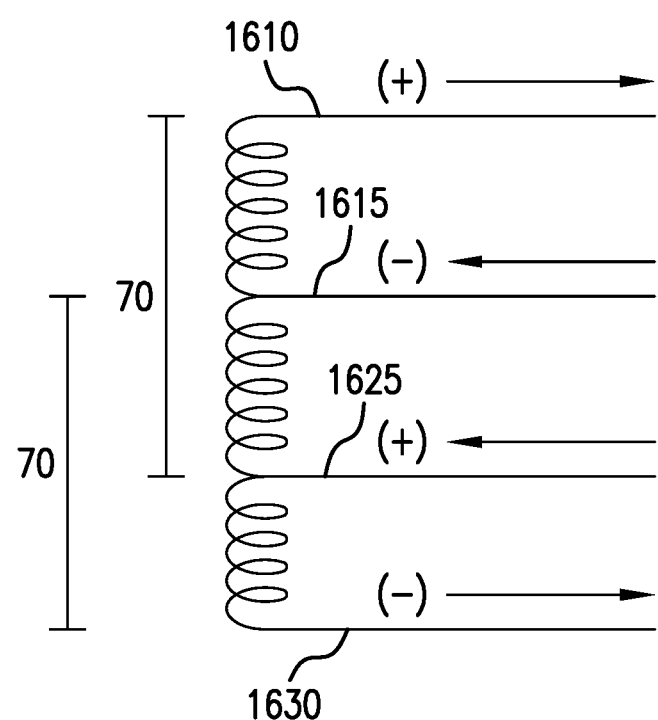
FIG. 16 depicts a schematic view of an exemplary SERPS having wining taps other than center-tapped.

FIG. 16 depicts a schematic view of an exemplary SERPS having winding taps other than center-tapped. While some embodiments of a SERPS circuit may inject current into a center-tap of an output winding, some embodiments may inject current at taps that are not necessarily symmetrically placed relative to the charging and return terminals of the winding. In various implementations, the injection taps may be between about 10% and about 90%, such as, for example, about 25%, 30%, 40%, 50%, 60%, 70%, or 75% relative to the charging and return windings.

In the depicted example, an output winding 1605 has a charging terminal 1610, a pair of injection terminals 1615, 1625, and a return terminal 1630. In an illustrative example, the charging terminal 1610 and the injection terminal 1625 may connect to a first switch and a second switch, for example. The first switch and the second switch may correspond to positive half wave operations. As depicted, the injection terminal 1625 corresponds to seventy percent of the output winding 1605. In some embodiments, the injection terminal may correspond to a predetermined range, such as twenty percent to eighty percent, for example. The injection terminal 1615 and the return terminal 1630 may connect to a third and fourth switch. The third and fourth switch may correspond to negative half wave operations, for example.

Figure 17:
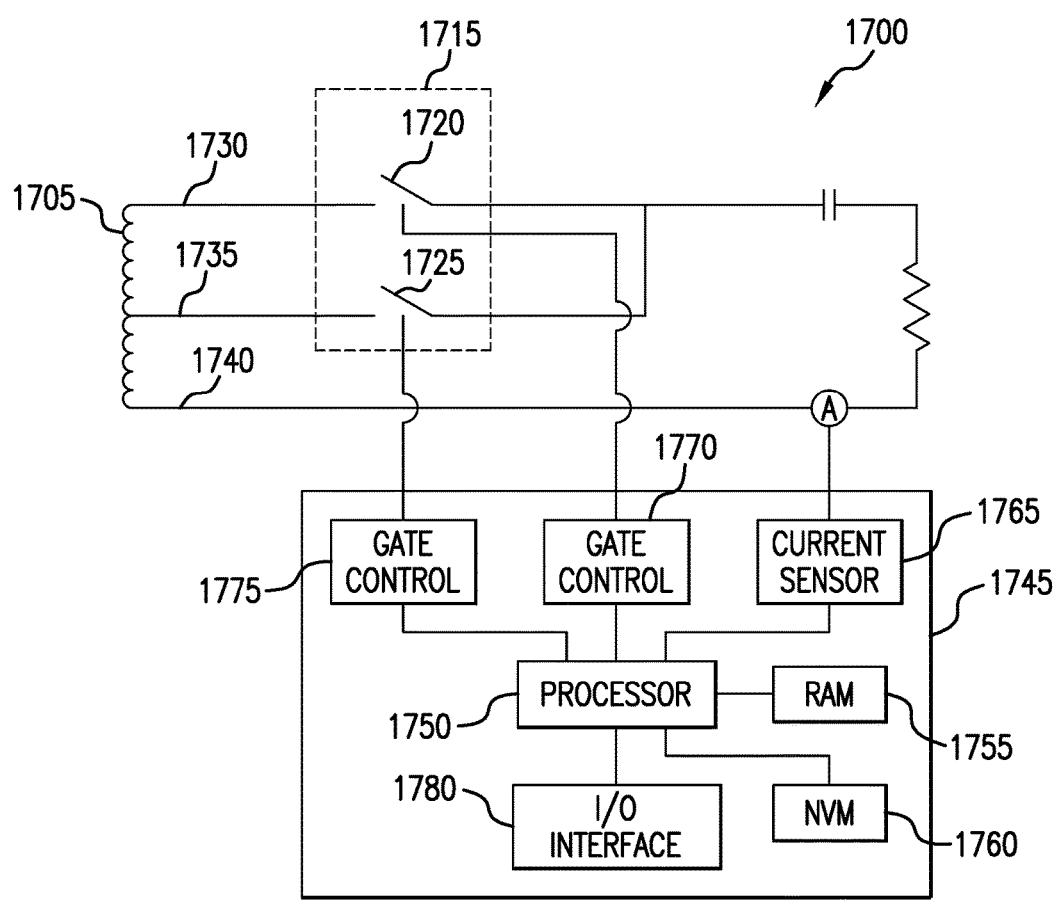
FIG. 17 depicts a schematic view of an exemplary switch control system of an exemplary half wave SERPS.

FIG. 17 depicts a schematic view of an exemplary switch control system of an exemplary half wave SERPS. A half wave SERPS 1700 includes an output winding 1705 connected to a load 1710 through a switching network 1715. The load 1710 includes an energy storage device (e.g., a capacitor) and a lossy device (e.g., resistive load). The switching network 1715 includes a charging switch 1720 and a discharging switch 1725. As depicted, the output winding 1705 includes a center tap (e.g., fifty percent). In some embodiments, the center tap may be within a range, such as twenty percent to fifty percent, for example. The output winding 1705 connects the load 1710 via a charging terminal 1730, an injection terminal 1735 and a return terminal 1740. The charging terminal 1730 connects to the load 1710 through the charging switch 1720. The injection terminal 1735 connects to the load 1710 through the discharging switch 1725 while the return terminal 1740 connects to the load 1710.

A switching control system 1745 includes a switching processor 1750. The switching processor 1750 operably connects to random-access-memory 1755 and a data store 1760. A current sensor 1765 operably connects to the switching processor 1750. The current sensor 1765 operably connects to the return terminal 1740 such that the current sensor 1765 may monitor a return current from the load 1710 to the output winding 1705. The current sensor 1765 may transmit a detected return current to the switching processor 1750, for example. A pair of gate control modules 1770-1775 operably connect to the switching processor 1750. As depicted, the gate control module 1770 operably connects to the charging switch 1720, and the gate control module 1775 operably connects to the discharging switch 1725. An input/output interface 1780 operably connects to the switching processor 1750.

In an illustrative example, the data store 1760 may include switching instructions, such as opening a switch in accordance with a predetermined timing cycle, for example, to be executed by the switching processor 1750. The switching processor 1750 may transmit open and close commands to the switches 1720-1725 via the gate control modules 1770-1775. For example, during a first quarter of a positive half wave cycle, the switching processor 1750 may transmit a close command to the charging switch 1720 via the gate control module 1775 to charge an energy storage device. During the second quarter of the positive half wave cycle, the switching processor 1750 may transmit an open command to the charging switch 1720 and a close command to the discharging switch 1725 via the gate control modules 1770, 1775, respectively. During the second quarter of the positive half wave cycle, the energy storage device may discharge (injection current) into the output winding 1705 via the injection terminal 1735. The injection current may interact with a generator's magnetic field to produce a motoring action within a generator, for example.

Figure 18:
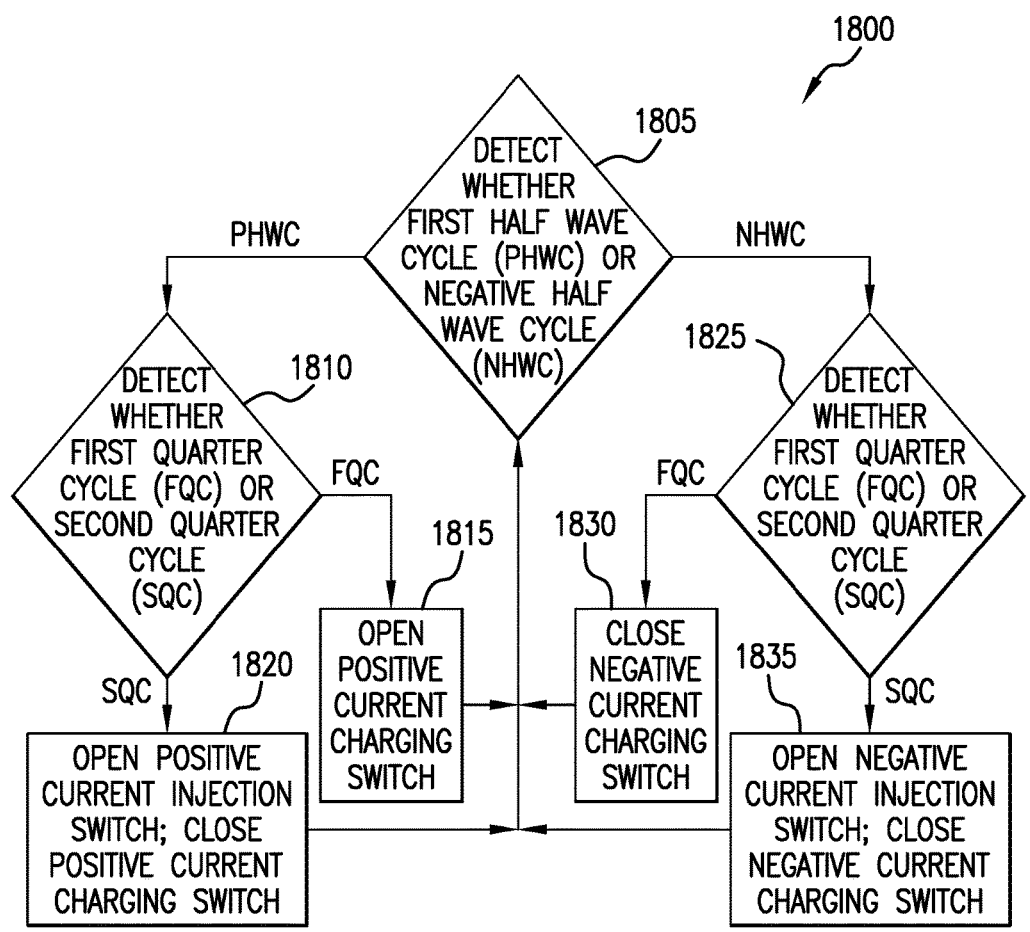
FIG. 18 depicts a flowchart of an exemplary SEPRS switching sequence.

FIG. 18 depicts a flowchart of an exemplary SEPRS switching sequence. A sequence 1800 commences, at 1805, with a processor 1750 (e.g., the processor 1750) detecting a polarity (e.g. positive half wave cycle or negative half way cycle) of an AC waveform, for example. If, at 1805, the processor detects a positive half wave cycle, the processor then determines, at 1810, whether the positive half wave cycle is in a positive first quarter or a positive second quarter. If the processor determines, at 1810, that the positive half wave cycle is in the positive first quarter, then the processor closes a positive current charging switch, such as the charging switch 350, for example, to allow current to flow along a positive current charging path (e.g., the current charging path 345). During the positive first quarter, a positive charging current may flow across a positive series capacitor (e.g., the series capacitor 355) and a positive resistive load (e.g., the resistive load 360). During the positive first quarter, the positive charging current may charge the positive series capacitor. The processor then repeats the step 1805.

If the processor determines, at 1810, that the positive half wave cycle is in the positive second quarter, then the processor opens the positive current charging switch and closes a positive current injection switch, such as the current injection switch 370, for example, to allow an injection current to flow along a positive injection charging path (e.g., the injection charging path 365). During the positive second quarter, the positive injection current may flow across the positive series capacitor and the positive resistive load such that the positive series capacitor dissipates energy into the positive resistive load and into an output winding (e.g. the output winding 305). The processor then repeats the step 1805.

If, at 1805, the processor detects a negative half wave cycle, the processor then determines, at 1810, whether the negative half wave cycle is in a negative first quarter or a negative second quarter. If the processor determines, at 1810, that the negative half wave cycle is in the negative first quarter, then the processor closes a negative current charging switch, such as the current charging switch 405, for example, to allow current to flow along a negative current charging path (e.g., current charging path 445). During the negative first quarter, a negative charging current may flow across a negative series capacitor (e.g., the series capacitor 415) and a negative resistive load (e.g., the resistive load 420). During the negative first quarter, the charging current may charge the negative series capacitor. The processor then repeats the step 1805.

If the processor determines, at 1810, that the negative half wave cycle is in the negative second quarter, then the processor opens the negative current charging switch and closes a negative current injection switch, such as the current discharging switch 410, for example, to allow current to flow along a negative injection charging path (e.g., the injection charging path 450). During the negative second quarter, a negative charging current may flow across a negative series capacitor (e.g., the series capacitor 415) and a negative resistive load (e.g., the resistive load 420). During the negative second quarter, the series capacitor 415 may discharge through the switch 410 into a winding, for example. The processor then repeats the step 1805. The processor may continue to repeat the steps 1805-1830 so long as the output winding generates current.

Figure 19:
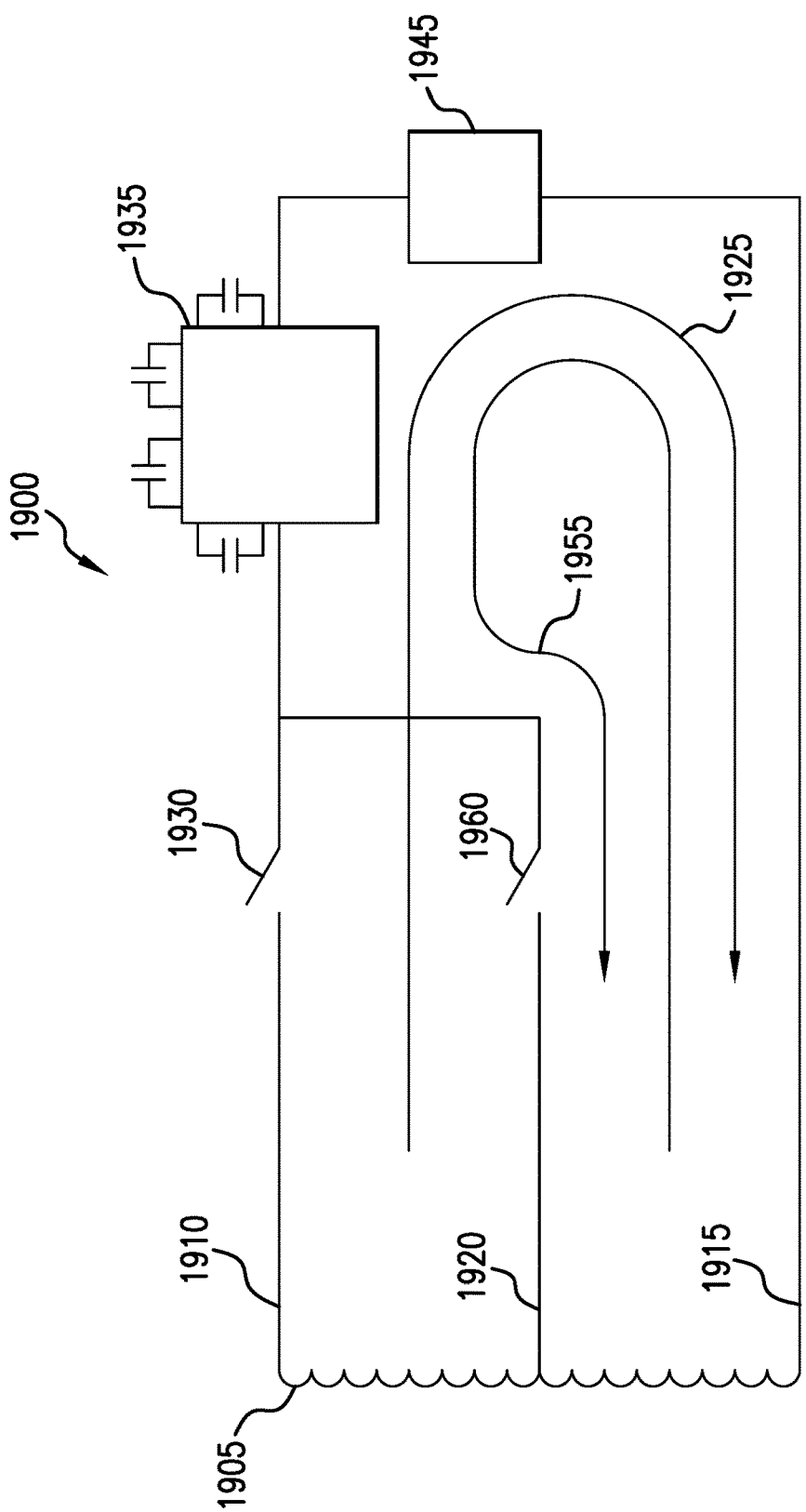
FIG. 19 depicts a schematic view of an exemplary SERPS having parallel charging and series discharging of energy storage devices.

FIG. 19 depicts a schematic view of an exemplary SERPS having parallel charging and series discharging of energy storage devices. A SERPS 1900 includes an output winding 1905. The output winding 1905 includes a charging terminal 1910 and a return terminal 1915. The output winding 1905 further includes an injection terminal 1920 at a tap of the output winding 1905. A current charging path 1925 travels from the charging terminal 1910 to the return terminal 1915 when a current charging switch 1930 is closed. The current charging path 1925 travels through a capacitive network 1935 and a resistive load 1945. The capacitive network 1935 includes a capacitive switching network that is operable to configure an electrical path through the set of provided capacitors either in parallel or series in response to a control signal.

In an example, a current injection path 1955 travels from the return terminal 1915 to the injection terminal 1920 when the current charging switch 1930 is open and a current injection switch 1960 is closed, in conjunction with a rearrangement of capacitive switching network which provides for the network of capacitors to discharge in series (e.g., additive voltage across the series-arranged capacitors).

In an illustrative example, the circuit controller 240, with reference to FIG. 2, may close the current charging switch 1930 to permit a charging current to flow along the current charging path 1925. The charging current may flow from the charging terminal 1910 through the capacitive network 1935 and the resistive load 1945 to the return terminal 1915 during a first quarter cycle, such as the first quarter cycle 335, for example. The capacitive switching network 1935 may permit the charging current to charge the capacitors in parallel during the first quarter cycle. The circuit controller 240, in response to the first quarter cycle ending and a second quarter cycle beginning, may open the current charging switch 1930 and close the current injection switch 1920 to permit an injection current to flow along the injection current path 1955. The capacitive switching network 1935 may operate to reconfigure the capacitors from a parallel arrangement to a series arrangement, for example. Thus, the capacitive switching network 1935 may permit the current to flow from the return terminal 1915 to the injection terminal 1920 through the capacitors 1935 arranged in series through the resistive load 1945 and into the tap at the injection terminal 1920.

In various embodiments, a set of capacitors may charge during first and third quarter cycles (e.g., generally rising voltage or current excitation) of an alternating polarity excitation waveform while the capacitive switching network 1935 may configure the charging current to flow through the set of capacitors connected in electrical parallel. In the subsequent second and fourth quarter cycles cycles (e.g., generally falling voltage or current excitation), the capacitive switching network 1935 may configure the injection current to flow through the set of capacitors in connected in a series circuit path. This operation may advantageously increase, in some implementations, the amount of energy returned from the capacitors to the input source, e.g., in the form of assisting torque for the prime mover.

In some embodiments, a capacitive switching controller may operate the switching network device. In response to the current charging switch 1930, the capacitive switching controller may coordinate a network of switches in the parallel capacitive network 1935 such that the series capacitive network charges in parallel, for example. In response to the current injection switch 1960, the capacitive switching controller may coordinate a network of switches in the parallel capacitive network 1935 such that the series capacitive network discharges in series, for example. In some embodiments, the switching control system 1745 may include the capacitive switching controller, for example.

Although various embodiments have been described with reference to the Figures, other embodiments are possible. For example, in some embodiments a capacitor is charged during a portion of the AC waveform in which the rate of change of the line voltage with respect to time is high. A capacitor's current may be proportional to this voltage-time rate of change. This voltage-time rate of change may be high when the voltage is relatively small compared with the peak voltage of the AC waveform. Conversely when the waveform is at or near the peak voltage of the AC waveform, the voltage-time rate of change is low. Thus, the voltage magnitude may be out of phase with the voltage-time rate of change for an AC waveform. The capacitor charging current may therefore be out of phase with the voltage magnitude. Changing the capacitor may incur a power cost. This power cost may be measured by computing the product of the instantaneous current and the instantaneous voltage. The out of phase relationship between the charging current and the voltage result in an energy cost that is reduced in comparison to the energy cost of an in phase relation of an otherwise identical charging current and voltage. Thus, one might think of this as charging the capacitor through a resistive load during a low-cost energy portion of the waveform.

The stored energy is then dissipated in the resistor and injected into the secondary during the high-cost energy portion of the waveform—when both the current and the voltage are high. This high-cost energy portion of the waveform is when the voltage of the AC waveform is near its maximum. The current waveform is distributed in such a way the ratio of energy consumption of the resistor to net energy delivered by the transformer is maximized.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the first receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using Omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Fire wire, ATA/IDE, RS-232, RS-422, RS-485, 802.11a/b/g, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

A number of implementations have been described. Nevertheless, it will be understood that various modifications may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:

1. A method comprising:
   providing a magnetic flux path to couple energy between an input source and an output winding;
   providing a charging terminal and a return terminal at opposite ends of the output winding, and an injection terminal at a tap between the charging terminal and the return terminal;
   exciting the magnetic flux path with a periodic flux waveform alternately having a positive half-cycle and a negative half-cycle, wherein the positive half-cycle is formed of temporally adjacent first and second quarter cycles, and the negative half-cycle is formed of temporally adjacent third and fourth quarter cycles;
   during the first quarter cycle, providing a positive charging current path from the charging terminal to the return terminal through a series capacitance and a resistive load to transfer energy from the flux waveform to the resistive load;
   interrupting the charging current path at a predetermined point in the positive half-cycle;
   during the second quarter cycle, providing a positive injection current path from the return terminal to the injection terminal through the series capacitance and the resistive load to transfer energy to the input source while simultaneously dissipating energy in the resistive load;
   during the third quarter cycle, providing a negative charging current path from the return terminal to the charging terminal through the series capacitance and the resistive load to transfer energy from the flux waveform to the resistive load;
   interrupting the negative charging current path at a predetermined point in the negative half-cycle; and,
   during the fourth quarter cycle, providing a negative injection current path from the charging terminal to the injection terminal through the series capacitance and the resistive load to transfer energy to the input source while simultaneously dissipating energy in the resistive load.

2. The method of claim 1, wherein the input source comprises a primary winding of a transformer and the output winding comprises a secondary winding of the transformer.

3. The method of claim 2, wherein the primary winding has a first number of turns Np and the secondary winding has a second number of turns Ns, and the number of turns between the injection tap and the return terminal has k*Ns turns, where k<1.

4. The method of claim 3, wherein during the first quarter cycle, energy input to the primary winding couples to the secondary winding with an effective primary-to-secondary turns ratio of Np:Ns, and during the second quarter cycle, energy input to the secondary winding at the injection terminal couples to the primary winding with an effective primary-to-secondary turns ratio of Np:k*Ns.

5. The method of claim 1, wherein the tap is located at an electrically symmetric center-point between the charging terminal and the return terminal.

6. The method of claim 1, wherein the tap couples to the output winding at a point between about twenty to fifty percent of the electrical distance between the charging terminal and the return terminal.

7. The method of claim 1, wherein the tap couples to the output winding at a point between about fifty to eighty percent of the electrical distance between the charging terminal and the return terminal.

8. The method of claim 1, wherein the input source comprises a rotating magnetic field source.

9. The method of claim 8, further comprising a prime mover operably coupled to rotate the magnetic field source, wherein during the second and fourth quarter cycles, the transfer of energy to the input source comprises an assisting torque to the prime mover.

10. The method of claim 9, wherein the prime mover comprises a combustion engine.

11. The method of claim 9, wherein the prime mover comprises an electric motor.

12. A method comprising:
    providing a magnetic flux path to couple energy between an input source and an output winding;
    providing a charging terminal and a return terminal at opposite ends of the output winding, and an injection terminal at a tap between the charging terminal and the return terminal;
    exciting the magnetic flux path with a periodic flux waveform having a positive half-cycle the positive half-cycle formed from temporally adjacent first and second quarter cycles;
    during the first quarter cycle, providing a charging current path from the charging terminal to the return terminal through a series capacitance and a resistive load to transfer energy from the flux waveform to the resistive load;
    interrupting the charging current path at a predetermined point in the positive half-cycle; and,
    during the second quarter cycle, providing an injection current path from the return terminal to the injection terminal through the series capacitance and the resistive load to transfer energy to the input source while simultaneously dissipating energy in the resistive load.

13. The method of claim 12, wherein the input source comprises a primary winding of a transformer and the output winding comprises a secondary winding of the transformer.

14. The method of claim 13, wherein the primary winding has a first number of turns Np and the secondary winding has a second number of turns Ns, and the number of turns between the injection tap and the return terminal has k*Ns turns, where k<1.

15. The method of claim 14, wherein during the first quarter cycle, energy input to the primary winding couples to the secondary winding with an effective primary-to-secondary turns ratio of Np:Ns, and during the second quarter cycle, energy input to the secondary winding at the injection terminal couples to the primary winding with an effective primary-to-secondary turns ratio of Np:k*Ns.

16. The method of claim 12, wherein the input source comprises a rotating magnetic field source.

17. The method of claim 16, further comprising a prime mover operably coupled to rotate the magnetic field source.

18. The method of claim 17, wherein during the second quarter cycle, the transfer of energy to the input source comprises an assisting torque to the prime mover.

19. An apparatus comprising:
    a magnetic flux path to couple energy between an input source and an output winding;
    a charging terminal and a return terminal at opposite ends of the output winding, and an injection terminal at a tap between the charging terminal and the return terminal;

an electronically controllable charging switch that, in a conducting state, electrically connects an output node to the charging terminal, and in a non-conducting state, electrically disconnects the charging terminal from the output node;

an electronically controllable injection switch that, in a conducting state, electrically connects the output node to the injection terminal, and in a non-conducting state, electrically disconnects the injection terminal from the output node;

a controller operatively connected to control the conducting state of the charging switch, and further operatively connected to control the conducting state of the injection switch;

a data store operably coupled to the controller, wherein the data store contains a program of instructions that, when executed by the controller, cause the controller to perform operations to control the charging switch and the injection switch to direct current via the output node through a series capacitance and a resistive load in response to excitation of the magnetic flux path with a periodic flux waveform having a positive half-cycle formed of temporally adjacent first and second quarter cycles, the operations comprising:

controlling, during the first quarter cycle, the charging switch to the conducting state and the injection switch to the non-conducting state to form a charging current path from the charging terminal to the return terminal through the series capacitance and the resistive load to transfer energy from the flux waveform to the resistive load;

interrupt the charging current path at a predetermined point in the positive half-cycle; and, controlling, during the second quarter cycle, the charging switch to the non-conducting state and the injection switch to the conducting state to form a positive injection current path from the return terminal to the injection terminal through the series capacitance and the resistive load to transfer energy to the input source while simultaneously dissipating energy in the resistive load.

20. The apparatus of claim 19, wherein the input source comprises a rotating magnetic field source, the apparatus further comprising a prime mover operably coupled to rotate the magnetic field source, wherein during the second quarter cycle, the transfer of energy to the input source comprises an assisting torque to the prime mover.

* * * * *